(12) United States Patent
Ganesan et al.

(10) Patent No.: US 7,895,437 B2
(45) Date of Patent: Feb. 22, 2011

(54) AUGMENTED SINGLE FACTOR SPLIT KEY ASYMMETRIC CRYPTOGRAPHY-KEY GENERATION AND DISTRIBUTOR

(75) Inventors: Ravi Ganesan, Half Moon Bay, CA (US); Ravi Singh Sandhu, Oak Hill, VA (US); Andrew Paul Cottrell, San Jose, CA (US); Kyle Austin, New York, NY (US)

(73) Assignee: VMware, Inc., Palo Alto, CA (US)

( * ) Notice: Subject to any disclaimer, the term of this patent is extended or adjusted under 35 U.S.C. 154(b) by 1172 days.

(21) Appl. No.: 11/421,076

(22) Filed: May 31, 2006

(65) Prior Publication Data

US 2007/0033392 A1 Feb. 8, 2007

(51) Int. Cl.
*H04L 29/00* (2006.01)

(52) U.S. Cl. .............. 713/171; 713/155; 713/168; 713/176; 380/30; 380/44; 380/45; 380/277; 380/282

(58) Field of Classification Search .......... 713/155, 713/168, 171, 176; 380/30, 44, 45, 277, 380/282
See application file for complete search history.

(56) References Cited

U.S. PATENT DOCUMENTS

| | | | |
|---|---|---|---|
| 5,434,918 A | 7/1995 | Kung et al. | |
| 5,465,084 A | 11/1995 | Cottrell | |
| 5,559,961 A | 9/1996 | Blonder | |
| 5,588,061 A * | 12/1996 | Ganesan et al. | 380/30 |
| 5,608,387 A | 3/1997 | Davies | |
| 5,623,546 A * | 4/1997 | Hardy et al. | 713/193 |
| 5,821,933 A | 10/1998 | Keller et al. | |
| 6,006,328 A | 12/1999 | Drake | |
| 6,161,139 A | 12/2000 | Win et al. | |
| 6,209,104 B1 | 3/2001 | Jalili | |
| 6,374,359 B1 | 4/2002 | Shrader et al. | |

(Continued)

FOREIGN PATENT DOCUMENTS

WO  WO 01/63878 A1  8/2001

(Continued)

OTHER PUBLICATIONS

Yang & Rhee, "The Design and Implementation of Improved Secure Cookies Based on Certificate," Indocrypt 2002, Dec. 16-18, 2002, pp. 314-325, Springer-Verlag, Berlin 2002.

(Continued)

*Primary Examiner*—Carl Colin

(57) ABSTRACT

To establish credentials, a user network station transmits a first value. An authenticating entity network station generates a first key portion based on the transmitted first value and a second value unknown to the user, splits one of a private key and a public key of a user asymmetric crypto-key into the first key portion and a second key portion, stores the second key portion of the one key so as to be accessible only to the authenticating entity network device, generates a cookie including the second value, transmits the generated cookie to the user network station, and destroys the transmitted first value, the second value, the one key, and the first key portion of the one key. The first value represents a first and the second value included in the transmitted cookie represents a second user credential useable to authenticate the user.

18 Claims, 18 Drawing Sheets

U.S. PATENT DOCUMENTS

| | | | |
|---|---|---|---|
| 6,691,232 B1 | | 2/2004 | Wood et al. |
| 6,715,080 B1 | | 3/2004 | Starkovich et al. |
| 6,948,063 B1 | * | 9/2005 | Ganesan et al. ............. 713/168 |
| 6,950,949 B1 | | 9/2005 | Gilchrist |
| 6,970,562 B2 | * | 11/2005 | Sandhu et al. ................. 380/30 |
| 6,980,081 B2 | | 12/2005 | Anderson |
| 6,981,147 B1 | * | 12/2005 | Hamann et al. ............. 713/175 |
| 6,985,953 B1 | * | 1/2006 | Sandhu et al. ............. 709/229 |
| 7,010,605 B1 | * | 3/2006 | Dharmarajan ............... 709/227 |
| 7,065,786 B2 | | 6/2006 | Taguchi |
| 7,100,049 B2 | | 8/2006 | Gasparini et al. |
| 7,559,088 B2 | * | 7/2009 | Cohen et al. ................... 726/26 |
| 2001/0045451 A1 | | 11/2001 | Tan et al. |
| 2002/0066039 A1 | | 5/2002 | Dent |
| 2002/0078345 A1 | * | 6/2002 | Sandhu et al. ............. 713/155 |
| 2004/0010721 A1 | | 1/2004 | Kirovski et al. |
| 2004/0030934 A1 | | 2/2004 | Mizogushi et al. |
| 2004/0073795 A1 | | 4/2004 | Jablon |
| 2004/0093527 A1 | | 5/2004 | Pering et al. |
| 2004/0168083 A1 | | 8/2004 | Gasparini et al. |
| 2005/0177750 A1 | | 8/2005 | Gasparini et al. |
| 2005/0268100 A1 | | 12/2005 | Gasparini et al. |
| 2005/0268101 A1 | | 12/2005 | Gasparini et al. |
| 2005/0268107 A1 | | 12/2005 | Harris et al. |

FOREIGN PATENT DOCUMENTS

WO        WO 02/44872 A2      6/2002

OTHER PUBLICATIONS

Park, Sandhu & Ghanta, "Role Based Access Control on the Web." ACM Transactions on Information and System Security, vol. 4, No. 1, Feb. 2001, pp. 37-71.

Khu-Smith & Mitchell, "Enhancing the Security of Cookies," ICICS 2001, Dec. 6-7, 2001, pp. 132-145, LNCS 2288, Springer-Verlag, Berlin, 2002.

Park & Sandhu, "Secure Cookies on the Web," IEEE Internet Computing, vol. 4, No. 4, Jul. 2000 pp. 36-45.

Rachna Dhamija, J.D. Tygar, The Battle Against Phishing: Dynamic Security Skins, Symposium on Usable Privacy and Security (SOUPS), Jul. 6-8, 2005, Pitt., PA, 12 pages.

"Verified by Visa", Online Demonstration, Password Window Details, "Personal Message", 2002. http://usa.visa.com/personal/secure_with_visa/verified/how_it_works.html.

Visa U.S.A. Press Release. "CDNOW Makes Online Payments More Secure With Visa Player Authentication", Aug. 1, 2001, http://usa.visa.com/personal/newsroom/press_releases/nr24.html.

Anshu, Nahar, "RE:3D Secure Vulnerabilitys?" Online forum, Oct. 24, 2001, http://lists.commerce.net/archives/set-discuss/200110/msg00004.html.

Merkow, Mark, "Visa Prepares To Roll Out 'Verified by Visa' Service", Earthweb.com Aug. 2, 2001. http://news/earthweb.com/wireless/print.php/858951.

Tally, Greg, Roshan Thomas and Ton Van Vleck, "Anti-Phishing: Best Practices for Institutions and Consumers", McAfee Security research, Mar. 2004, Santa Clara, CA.

Radwin, Michael J., "A Challenge-Response Protocol with Digital Signatures", May 1997, http://www.radwin.org/michael/projects/jnfs/paper/node32.html.

Tally, Greg, :How Phishing Can Impact You and Your Organization, Power Point presentation, McAfee Research, Mar. 2004.

* cited by examiner

| USER 1 | | | | | | 1000 |
|---|---|---|---|---|---|---|
| SUID | UID | | | | | |
| $CE_R$ | $CE_{ak}$ | | | | | |
| | CUSTOMIZED INFORMATION | | | | | |
| | $CD_{U2}$, $CE_U$, $N_U$ | | | | | |

| USER 1 | | | | | |
|---|---|---|---|---|---|
| UID | | | | | |
| $CE_R$ | | | | | |
| $CE_{ak}$ | | | | | |
| CUSTOMIZED INFORMATION | | | | | |
| $CD_{U2}$, $CE_U$, $N_U$ | | | | | |

AUGMENTED SINGLE FACTOR SPLIT KEY ASYMMETRIC CRYPTOGRAPHY-KEY GENERATION AND DISTRIBUTOR

RELATED APPLICATIONS

This application is related to concurrently filed U.S. application Ser. No. 11/421,080, entitled "SECURE LOGIN USING AUGMENTED SINGLE FACTOR SPLIT KEY ASYMMETRIC CRYPTOGRAPHY", and to concurrently filed U.S. application Ser. No. 11/421,088, entitled "SECURE LOGIN USING SINGLE FACTOR SPLIT KEY ASYMMETRIC CRYPTOGRAPHY AND AN AUGMENTING FACTOR", the contents of which are incorporated herein in their entirety by reference.

This application is also related to U.S. application Ser. No. 11/332,204, filed Jan. 17, 2006, and entitled "ASYMMETRIC CRYPTOGRAPHY WITH ROLLING KEY SECURITY", the contents of which are incorporated herein in their entirety by reference.

This application is also related to U.S. application Ser. No. 11/055,987, filed Feb. 14, 2005, and entitled "ARCHITECTURE FOR ASYMMETRIC CRYPTO-KEY STORAGE", U.S. application Ser. No. 11/055,986, filed Feb. 14, 2005, and entitled "TECHNIQUE FOR ASYMMERIC CRYPTO-KEY GENERATION", U.S. application Ser. No. 11/056,120, filed Feb. 14, 2005, and entitled "MULTIPLE FACTOR PRIVATE PORTION OF AN ASYMMETRIC KEY", U.S. application Ser. No. 11/055,988, filed Feb. 14, 2005, and entitled "AUTHENTICATION PROTOCOL USING A MULTI-FACTOR ASYMMETRIC KEY PAIR", U.S. application Ser. No. 11/056,116, filed Feb. 14, 2005, and entitled "ROAMING UTILIZING AN ASYMMETRIC KEY PAIR", U.S. application Ser. No. 11/056,114, filed Feb. 14, 2005, and entitled "ASYMMETRIC KEY PAIR HAVING A KIOSK MODE", and U.S. application Ser. No. 11/056,115, filed Feb. 14, 2005, and entitled "TECHNIQUE FOR PROVIDING MULTIPLE LEVELS OF SECURITY", the contents of which are incorporated herein in their entirety by reference.

TECHNICAL FIELD

This invention relates to cryptosystems. More particularly, the present invention relates to asymmetric cryptography with an augmented single factor split key.

BACKGROUND ART

Today, computing devices are almost always interconnected via networks. These networks can be large closed networks, as within a corporation, or truly public networks, as with the Internet. A network itself might have hundreds, thousands or even millions of potential users. Consequently it is often required to restrict access to any given networked computer or service, or a part of a networked computer or service, to a subset of the users on the public or closed network. For instance, a brokerage might have a public website accessible to all, but would like to only give Ms. Alice Smith access to Ms. Alice Smith's brokerage account.

Access control is an old problem, tracing its roots to the earliest days of computers. Passwords were among the first techniques used, and to this day remain the most widely used, for protecting resources on a computer or service.

Single-Factor Password Authentication

In its simplest form, known as single factor password, or simply password, authentication, every user has a unique password and the authenticating computer has knowledge of the user password. When attempting to log on, Alice would enter her userid, say alice, and password, say apple23, the authenticating computer would compare the pair, i.e. alice, apple23, with the pair it had stored for Alice, and if there is a match would establish a session and give Alice access.

This simple scheme suffers from various problems. First, the table containing the passwords is stored on the authenticating computer, and thus represents a single point of compromise. If Eve could somehow steal this table, she would be able to access every user's account.

A second problem with this approach is that when Alice enters her password it travels from her terminal to the authenticating computer in the clear, and Eve could potentially eavesdrop. Such eavesdropping is known as a Man-In-The-Middle attack. For instance the terminal could be Alice's personal computer (PC) at home, and the authenticating computer could be a server on the Internet, in which case her password travels in the clear on the Internet. It will be recognized by those with ordinary skill in the art that a Man-in-The-Middle attack can go beyond eavesdropping, to modifying the contents of the communication.

Various solutions have been proposed and implemented to address these two issues.

Storing A Function of Passwords

For instance, to address the first problem of storing the password on the authenticating computer, the authenticating computer could instead store a one way function of the password, e.g. F(apple23)=XD45DTY, and the pair {alice, XD45DTY}. In this example as F(apple23) is a one way function, computing XD45DTY from apple23 is easy, but as it is a "one way function", the reverse is believed to be computationally difficult or close to impossible. So when Alice logs on and sends the authenticating computer {alice, apple23}, the authenticating computer can compute F(apple23) and compare the result with XD45DTY. The UNIX operating system was among the first to implement such a technique in the 1970's. However, this approach, while addressing the problems due to the storage of the password on the authenticating computer, does not address the problem of the password traveling in the clear.

Multifactor Password Authentication

Multiple factor authentication also exists as a potential solution to the problems inherent with single factor password authentication. In multiple factor password authentication, at least knowledge of, if not actual possession of, two or more factors, at least one of which comes from a password, must be shown for authentication to be complete. It should be understood that in multiple factor password authentication, each factor remains separate. That is, the factors are not combined. Further, the factors are not even concatenated. Several multiple factor authentication techniques exist, including one time password token techniques, password encrypted computer storage techniques, password secured smart card techniques, and split asymmetric key techniques.

-One Time Password Token Techniques-

In one time password token techniques, two passwords are utilized, one typically being a permanent password associated with the user, and the other being a temporary, one-time use, password generated by a password generator. The permanent password may be optional, and one or two temporary passwords may instead be used. The temporary password has a finite usable life, such as sixty seconds. At the end of the useable life, another temporary password is generated. An authenticating computer knows each usable password as well as its useable life, based upon algorithms well known to those of ordinary skill in the art. A user transmits both the permanent password (first factor) and a temporary password (second factor) to the authenticating computer which then verifies both passwords. The passwords are transmitted in the clear, thus token techniques are subject to man-in-the-middle attacks.

-Password Encrypted Computer Storage Techniques-

Using password encrypted storage techniques, a cryptographic key is stored on either removable media or a hard drive of the user's terminal. The cryptographic key is encrypted with a user's password. After decryption with the user's password (first factor), the key (second factor) is then stored temporarily in memory of the user's terminal where it is used to either encrypt or decrypt information. As will be recognized by those of ordinary skill in the art, this particular approach is undesirable due to it being susceptible to a dictionary attack, as will be further discussed below.

-Password Secured Smart Card Storage Techniques-

In smart card techniques, a private portion of a cryptographic key is stored on a smart card, which is portable. A specialized reader attached to a user terminal is used to access the smart card. The user enters a password (the first factor), such as a personal identification number (PIN), to 'unlock' the smart card. Once unlocked, the smart card encrypts or decrypts information using the key (second factor) stored thereon. It should be stressed that in smart card techniques the key never leaves the smart card, unlike in the encrypted storage techniques discussed above. Rather, electronics within the smart card itself perform the encrypting and/or decrypting. Smart card techniques are associated with certain problems. These problems include the fact that the techniques are costly to implement, due to hardware costs. Further, a lack of readers makes use of a user's smart card difficult, and smart cards themselves are subject to loss.

-Split Asymmetric Key Techniques-

Symmetric Key Cryptography

Before discussing in detail the more sophisticated conventional techniques for authentication, which are based upon split key technology, let us briefly describe symmetric and asymmetric key cryptography.

In symmetric key cryptography, the two parties who want to communicate in private share a common secret key, say K. The sender encrypts a message with K, to generate a cipher, i.e. $C=Encrypt(M,K)$. The receiver decrypts the cipher to retrieve the message, i.e. $M=Decrypt(C,K)$. An attacker who does not know K, and sees C, cannot successfully decrypt the message M, if the underlying algorithms are strong. Examples of such systems are DES3 and RC4. Encryption and decryption with symmetric keys provide a confidentiality, or privacy service.

Symmetric keys can also be used to provide integrity and authentication of messages in a network. Integrity and authentication means that the receiver knows who sent a message and that the message has not been modified so it is received as it was sent. Integrity and authentication is achieved by attaching a Message Authentication Code (MAC) to a message M. E.g., the sender computes $S=MAC(M,K)$ and attaches S to the message M. When the message M reaches the destination, the receiver also computes $S'=MAC(M,K)$ and compares S' with the transmitted value S. If $S'=S$ the verification is successful, otherwise verification fails and the message should be rejected. Early MACs were based on symmetric encryption algorithms such as DES, whereas more recently MACs are constructed from message digest functions, or "hash" functions, such as MD5 and SHA-1. The current Internet standard for this purpose is known as hash-based MAC (HMAC).

By combining confidentiality with integrity and authentication, it is possible to achieve both services with symmetric key cryptography. It is generally accepted that different keys should be used for these two services and different keys should be used in different directions between the same two entities for the same service. Thus if Alice encrypts messages to Bob with a shared key K, Bob should use a different shared key K' to encrypt messages from Bob to Alice. Likewise Alice should use yet another key K" for MACs from Alice to Bob and Bob should use K'" for MACs from Bob to Alice. Since this is well understood by those skilled in the art, we will follow the usual custom of talking about a single shared symmetric key between Alice and Bob, with the understanding that strong security requires the use of four different keys.

Symmetric key systems have always suffered from a major problem—namely how to perform key distribution. How do Bob and Alice agree on K?

Asymmetric Key Cryptography

Asymmetric key cryptography was developed to solve this problem. Here every user is associated with a private/public crypto-key pair, commonly referred to as D and E, which are related by special mathematical properties. These properties result in the following functionality: a message encrypted with one of the two keys can then only be decrypted with the other.

One of these keys for each user is made public and the other is kept private. Let us denote the former by E, and the latter by D. So Alice knows $D_{alice}$, and everyone knows $E_{alice}$. To send Alice the symmetric key K, Bob simply sends ciphertext $C=Encrypt(K,E_{alice})$. Alice, and only Alice (since no one else knows $D_{alice}$), can decrypt the ciphertext C to recover the message, i.e. $Decrypt(C,D_{alice})=K$. Now both Alice and Bob know K and can use it for encrypting subsequent messages using a symmetric key system. Why not simply encrypt the message itself with the asymmetric system? This is simply because in practice all known asymmetric systems are fairly inefficient, and while they are perfectly useful for encrypting short strings such as K, they are inefficient for large messages.

The above illustrates how asymmetric cryptography can solve the key distribution problem. Asymmetric cryptography can also be used to solve another important problem, that of digital signatures. To sign a message M, Alice encrypts it with her own private key to create $S=Encrypt(M,D_{alice})$. She can then send (M,S) to the recipient who can then decrypt S with Alice's public key to generate M', i.e. $M'=Decrypt(S, E_{alice})$. If $M'=M$ then the recipient has a valid signature as only someone who has $D_{alice}$, by definition only Alice, can generate S, which can be decrypted with $E_{alice}$ to produce M. To convey the meaning of these cryptographic operations more clearly they are often written as $S=Sign(M,D_{alice})$ and $M'=Verify(S,E_{alice})$. It is worth noting that asymmetric key digital signatures provide non-repudiation in addition to the integrity and authentication achieved by symmetric key MACs. With MACs the verifier can compute the MAC for any message M of his choice, since the computation is based on a shared secret key. With digital signatures this is not possible since only the sender has knowledge of the sender's private key required to compute the signature. The verifier can only verify the signature, but not generate it. It will be recognized by those skilled in this art that there are numerous variations and elaborations of these basic cryptographic operations of symmetric key encryption, symmetric key MACs, asymmetric key encryption and asymmetric key signatures.

The RSA cryptosystem is one system that implements asymmetric cryptography as described above. In particular, the RSA cryptosystem allows the same private-public cryptokey pair to be used for encryption and for digital signatures. It should be noted that there are other asymmetric cryptosystems that implement encryption only e.g., ElGamal, or digital signature only, e.g., DSA. Technically the public key in RSA is a pair of numbers E, N and the private key is the pair of numbers D, N. When N is not relevant to the discussion, it is commonplace to refer only to the public key as E and the private key as D.

Finally, the above description does not answer the important question of how Bob gets Alice's public key $E_{alice}$. The process for getting and storing the binding [Alice, $E_{alice}$] which binds $E_{alice}$ to Alice is tricky. The most practical method appears to be to have the binding signed by a common trusted authority. Such a "certificate authority" (CA) can create $CERT_{alice}$=Sign([Alice, $E_{alice}$], $D_{ca}$). Now $CERT_{alice}$ can be verified by anyone who knows the CA's public key $E_{ca}$. So in essence, instead of everyone having to know everyone else's public key, everyone only need know a single public key, i.e. that of the CA. More elaborate schemes with multiple Certificate Authorities, sometimes having a hierarchical relationship, have also been proposed.

Asymmetric key cryptosystems have been around for a long time, but have found limited use. The primary reasons are twofold: (a) the private key D in most systems is long, which means that users cannot remember them, and they have to either be stored on every terminal a user uses, or carried around on smart cards or other media; and (b) the infrastructure for ensuring a certificate is valid, which is critical, is cumbersome to build, operate, and use. The first technique proposed to validate certificates was to send every recipient a list of all certificates that had been revoked. This clearly does not scale well to an environment with millions of users. A later technique proposed to validate certificates was to require that one inquire about the validity of a certificate on-line, which has its own associated problems.

Split Asymmetric Key Cryptography

A system based on split asymmetric key cryptography has been developed to solve these two issues, i.e. long private keys and certificate validity, among others. In this system the private key for Alice, i.e. $D_{alice}$, is further split into two parts, a part $D_{aa}$ which Alice knows, and a part $D_{as}$ which is stored at a security server, where $D_{aa} * D_{as} = D_{alice}$ mod$\Phi$(N). To sign a message, Alice could perform a partial encryption to generate a partial signature, i.e. PS=Sign(M,$D_{aa}$). Alice then sends the server PS which 'completes' the signature by performing S=Sign(PS,$D_{as}$). This completed signature S is indistinguishable from one generated by the original private key, i.e. $D_{alice}$, so the rest of the process works as previously described. However, $D_{aa}$ can be made short, which allows the user to remember it as a password, so this system is user friendly. Further, if the server is informed that a particular ID has been suspended or revoked, then it will cease to perform its part of the operation for that user, and consequently no further signatures can ever be performed. This provides for instant revocation in a simple, highly effective fashion. It will be recognized by those skilled in the art that a split private key can be used in a similar manner for decryption purposes, and that the partial signatures (or encryptions) may be performed in the reverse sequence, that is first by the security server and subsequently by the user's computer, or may even be performed concurrently in both places and then combined.

Authentication Using Split Private Key Asymmetric Cryptography and the Secure Socket Layer (SSL)

Let us return now to password based systems. Challenge-response systems solve the issue of having to send passwords in the clear across a network. If the authenticating computer and Alice share a secret password, P, then the authenticating computer can send her a new random challenge, R, at the time of login. Alice computes C=Encrypt(R,P) and sends back C. The authenticating computer computes Decrypt(C,P)=C'. If C=C', then the authenticating computer can trust that it is Alice at the other end. Note however that the authenticating computer had to store P.

A more elegant solution can be created using asymmetric cryptography. Now Alice has a private key $D_{alice}$, or in a split private key system she has $D_{aa}$. The authenticating computer challenges her to sign a new random challenge R. She signs the challenge, or in the split private key system she interacts with the security server to create the signature, and sends it back to the authenticating computer which uses her public key, retrieved from a certificate, to verify the signature. Observe that the authenticating computer does not have to know her private key, and that an eavesdropper observing the signature on R gains no knowledge of her private key.

-Server Side SSL-

The secure socket layer (SSL) system, which is widely used on the Internet, in effect implements a more elaborate version of exactly this protocol. SSL has two components, 'server side SSL' in which a server proves its identity by correctly decrypting a particular message during connection set-up. As browsers, such as Netscape and Microsoft Internet Explorer, come loaded with the public keys of various CAs, the browser can verify the certificate of the server and use the public key therein for encryption. This authenticates the server to the client, and also allows for the set-up of a session key K, which is used to encrypt and MAC all further communications. Server side SSL is widely used, as the complexity of managing certificates rests with system administrators of web sites who have the technical knowledge to perform this function.

-Client Side SSL-

The converse function in SSL, client side SSL, which lets a client authenticate herself to a server by means of a digital signature, is rarely used. This is because although the technical mechanism is much the same, it now requires users to manage certificates and, unless they use a split private key, long private keys which has proven to be difficult. So in practice, most Internet web sites use server side SSL to authenticate themselves to the client, and to obtain a secure channel, and from then on use Userid, Password pairs to authenticate the client.

So far from disappearing, the use of passwords has increased dramatically. Passwords themselves are often dubbed as inherently "weak". This is inaccurate because, if they are used carefully, passwords can actually achieve "strong" security. As discussed above, passwords should not be sent over networks, and if possible should not be stored on the receiving computer. Instead, in a "strong" system, the user can be asked to prove knowledge of the password without actually revealing the password. Perhaps most critical is that passwords should not be vulnerable to dictionary attacks.

Vulnerability of Passwords to Dictionary Attacks

Dictionary attacks can be classified into three types. In all three types the starting point is a 'dictionary' of likely passwords. Unless the system incorporates checks to prevent it, users tend to pick poor passwords, and compilations of lists of commonly used poor passwords are widely available.

On line dictionary attack: Here the attacker types in a guess at the password from the dictionary. If the attacker is granted access to the computer they know the guess was correct. These attacks are normally prevented by locking the user account if there are an excessive number of wrong tries to gain access. Note that this very commonly used defense prevented one problem, but just created another one. An attacker can systematically go through and lock out the accounts of hundreds or thousands of users. Although the attacker did not gain access, now legitimate users cannot access their own accounts either, creating a denial of service problem.

Encrypt dictionary attacks: If somewhere in the operation of the system a ciphertext C=Encrypt(M,P) was created, and the attacker has access to both C and M, then the attacker can compute off-line C1=Encrypt(M,G1), C2=Encrypt(M, G2), ... where G1, G2, ... etc. are the guesses at the password P from the dictionary. The attacker stops when he finds a Cn=C, and knows that Gn=P. Observe that the UNIX file system, which uses a one way function F( ) instead of an encryption function E( ), is vulnerable to this attack.

Decrypt dictionary attacks: Here the attacker, does not know M, and only sees the ciphertext C (where C=Encrypt (M,P)). The system is only vulnerable to this attack if it is true that M has some predictable structure. So the attacker tries M1=Decrypt(C,G1), M2=Decrypt(C,G2)..., and stops when the Mi has the structure he is looking for. For instance Mi could be known to be a timestamp, English text, or a number with special properties such as a prime or a composite number with no small factors. Those with ordinary skill in the art will recognize there are numerous variations of the encrypt and decrypt dictionary attacks.

Protecting Passwords Against Dictionary Attacks

In split private key cryptography, the user portion of the private key, referred to as $D_{aa}$ above, may come from the user's password only. Thus, a compromise of the password, i.e, another person learning a user's password, results in a compromise of the split private key system. Also, there still remains the possibility of a dictionary attack on the server portion of the private key, referred to as $D_{as}$ above, because the user portion of the private key comes from the user's password only. Thus knowledge of $D_{aa}$ enables a dictionary attack on $D_{as}$. As discussed above, many of the existing split private key systems that address these problems rely upon expensive hardware. Because of this and other reasons, such systems have failed to gain widespread support.

However, more recently a split key asymmetric cryptographic system was developed which overcomes these vulnerabilities to dictionary attack as well as the other problems of proposed split private key systems. More particularly, as for example disclosed in U.S. application Ser. No. 09/739,260, filed Dec. 19, 2000, and entitled "SYSTEM AND METHOD FOR CRYPTO-KEY GENERATION AND USE IN CRYPTOSYSTEM", to overcome these problems Tricipher, Inc, the assignee of all rights in the present application, has developed a split key asymmetric cryptosystem in which users are associated with an asymmetric crypto-key pair having a public key and a private key, at least one of which, e.g. the private key, is split into multiple key portions, e.g. multiple private key portions. As in the conventional split key asymmetric cryptosystems discussed above, each of the key portions can be applied to an original message separately or in sequence and the partial results combined to form a transformed, i.e. encrypted, message, and the other key, e.g. the public key, can be applied to the transformed message to verify authenticity of the message preferably by recovering the original message, which authenticates the user. Conversely a message transformed, i.e. encrypted, with the other key, e.g. the public key, can be decrypted by applying each of the split key portions, e.g. the private key portions, to the transformed message separately or in sequence and the partial results combined to decrypt the original message.

However, unlike the other proposed split key asymmetric cryptosystem discussed above, the Tricipher system generates one of the multiple key portions of the asymmetric crypto-key using the password in conjunction with a secure one way function. That is $D_{aa}$ is computed each time $D_{aa}$ will be used, e.g. each time a session login is required, by expanding the user's password using a strong algorithm, preferably one complying with the PKCS5 IETF standard. Thus, $D_{aa}$ is computed in by taking a first Sha-1 hash of the password, where Sha-1 (password)=factor $F_p$ corresponding to the password, and applying this factor as an input to the PKCS-5 algorithm, along with the salt and the iteration count, i.e. $D_{aa}$=PKCS-5 {Sha-1 (password), salt, iteration count}. After the determination of $D_{aa}$, the first private key portion $D_{aa}$, the private key $D_{alice}$ and $N_{alice}$ are known, and $D_{as}$ can be computed based on the relationship $D_{aa}*D_{as}=D_{alice} \mod \Phi(N_{alice})$ to thereby complete the splitting of $D_{alice}$.

Neither $D_{aa}$ nor the user's password is ever stored more than temporarily on the network. Indeed, the password itself need be stored non-persistently, e.g. on RAM, for only the very short time period needed to compute $D_{aa}$. Furthermore, there is no need to transmit the user's password to login during or to initiate a session.

Additionally, the password is never used to encrypt a message or $D_{aa}$ and $D_{aa}$ itself is not transmitted over the network. Thus, the system provides a strong defense against encrypt and decrypt dictionary attacks.

Vulnerability of Passwords to Phishing by Impostor Website and Man-In-The-Middle (MITM) Attacks As noted above, users are often required to submit their user IDs and passwords as credentials to a website, in order to authenticate themselves to the website. In such cases, an attacker who gains access to a user ID and associated password, can impersonate the user from the attacker's or any other terminal.

-Impostor Website Attacks-

In practice users often have no absolute guarantee that the website to which they submit these credentials, is in-fact the website with which the user intends to communicate. This is because, while the website might look and feel like the intended website, e.g. the website of an Internet Service Provider (ISP) or some well-known e-commerce website such as an on-line bank or merchant, it could in-fact actually be an imposter website which has been set-up by an attacker to have the look and feel of the real website of the entity with whom the user wishes to communicate. This type of attack is commonly referred to as a form of "phishing".

If a user submits her credentials to the imposter website, an attacker could then use the submitted credentials to gain access to the user's confidential information and take advantage of the user's relationship with the real website and perhaps even other websites with which the user has registered the same credentials. For example, an attacker gaining access to the user's credentials could potentially transfer securities or money from the user's brokerage or bank account, and/or purchase products or services via the user's merchant account.

There are many ways for an attacker to fool a user into providing her credentials to an imposter website. For example, an attacker can send out a large number of e-mails inviting the user to logon to a well-known e-commerce website, such as paypal.com, but having a link to the website paypai.com, hoping that the recipient of the e-mail is registered at the financial website paypal.com. The attacker intends to capitalize on the fact that, although the last letter in the link to the imposter website is 'i' rather than "l", this distinction will be overlooked by the user and the user will activate the link. The web pages provided by the imposter website paypai.com are then made to look like those at the real website paypal.com. Thus, the user, viewing the impostor website after activating the link, may have no reason to suspect that the website is not the real paypal.com website. The user may therefore submit the credentials she has registered with the real paypal.com website, e.g. the user's ID and password, to the imposter website in an attempt to login. At this point, the user's credentials are captured by the imposter website. The attacker can then login to the real paypal.com website using the user's ID and password, and authorize or revoke transactions associated with the user's account, potentially even moving money into an account controlled by the attacker.

Thus, not only can the attacker mislead the user into believing that a imposter website is authentic, the attacker can mislead a real website into believing that the attacker is authentic, by using the user's credentials, i.e. the user's user ID and password, to authentic to the real website, resulting in the real website believing it is dealing with the user when in-fact it is dealing with the attacker.

The attacker might alternatively provide the user a link containing what appears on the user's display monitor to be a URL of the real website, e.g. paypal.com, but is in-fact a link to an imposter website. For example, the user may see a link that reads "http://" appended to www.paypal.com.%sdafghdgk%... which appears to be a link to the real website paypal.com with a long list of parameters that extend off the end of the URL window in the user's browser. However, unseen by the user, is that this link actually terminates with "...@paypa1.com". Thus when the user activates the link with a click of the user's mouse, the user is in-fact linked to the imposter website. The imposter website can then operate as above to obtain the user's credentials for the real website.

-Man-In-The-Middle (MITM) Attacks-

Although the use of an imposter website is a common means for an attacker to gain access to a user's user ID and password, these credentials can also be obtained by an attacker launching a man-in-the-middle (MITM) attack. For example, if the user's ID and password are stored on the user's terminal, an attacker may gain access to these credentials, from the user's own terminal. Furthermore, a sophisticated attacker may be able to capture the user's ID and password during the transmission of these credentials to the intended website. In either case, the attacker can then present the user ID and password to a website to successfully authenticate the attacker to that website. This type of attack is also commonly referred to as a form of "phishing".

Protection Against Impostor Website Attacks

As will be discussed below, various techniques have been proposed to combat impostor website attacks.

-Cookie Based Authentication-

A cookie is a message transmitted to a web browser of one network device, e.g. a user's PC, by another network device, such as a web server. The browser stores the message in a text file. The message is then sent back to the server each time a communication session is established between the browser and the server. A persistent cookie is one that is stored, for example, on a hard drive of the user's PC, until it expires based on a preset expiration date or the cookie is deleted from the hard drive. Many commercially available PC browser software programs, such as Internet Explorer™, Netscape™, and Fire Fox™ provide the functionality to support cookies. Thus, installing cookies on a PC and using these cookies does not require additional software to be loaded on and executed by many of the PCs currently in use.

For example, desired information can be packaged into a cookie and sent to the user's PC by a web server. The web browser of the user's PC then stores the received cookie for later use. The next time a communication session is established between the browser and the server from which the cookie was received, the browser will send the cookie back to that web server. The server can then use the information in the cookie for any number of purposes.

To provide protection against imposter websites, it has been proposed to place a cookie on the user's network device and use this cookie, in lieu of or together with the user's ID and password, to verify that the person attempting to login is in fact that user and not an impersonator.

Because the browser will normally send the stored cookie back to only the web server from which the cookie was received, this solution may help prevent an attacker that does not have access to the cookie, even if the attacker gains access to a required user ID and associated password, from impersonating a user from a network device other than the user's network device. Thus, the user of a cookie will provide enhanced protection against impostor websites.

However, a sophisticated attacker might be capable of tricking the browser on the user's device into transmitting the stored cookie to an imposter website. Thus, there remains a possibility that the cookie itself may be phished along with any required user ID and associated password, by an imposter website.

If the cookie is used either in lieu of a user ID and password, or together with a required user ID and password stored on the user's device, an attacker can gain access to the user credentials from the user's own network device. Additionally, an attacker may be able to capture the cookie, and any required user ID and password, during the transmission of these credentials from the user terminal to the actual website at which the user is registered. Thus, the cookie does little, if anything, to enhance security against an MITM attack.

The cookie may also be simple for a sophisticated attacker to reconstruct, i.e. to forge. If the cookie is used in lieu of the user's ID and password, the attacker can successfully impersonate a user from other than the user's network using only the forged cookie.

-Encrypted Cookie And Customized Information Based Authentication-

To make forgery of a cookie and phishing of the user's credentials more difficult, it has been proposed to use encrypted cookie based user authentication and customized information based website authentication. According to this proposal, a web server places an encrypted cookie on the user's device and uses this more sophisticated cookie to verify that the person attempting to login is in fact the user and not an impersonator.

More particularly, in this proposal the user's ID, and optionally other status information, are signed with a secret hash key, and then encrypted with a public key of an asymmetric crypto-key pair or a symmetric key by the website. Also encrypted are the unsigned user's ID and any unsigned other status information. The encrypted signed and the encrypted unsigned user ID and other status information are packaged into a cookie, which will sometimes be referred to as an encrypted cookie, by the web server. The web server then causes the browser of the user's device to store the encrypted cookie on the user's device. The encrypted cookie may be stored on conventional memory or disk storage of the user's network device or on a removeable device such as a smart card, USB memory token, or other portable memory device that interfaces to the user's network device.

In accordance with the proposal, when the user wishes to access a web page at the web server, the browser at the user's network device sends a request including the encrypted cookie to the web server. The web server decrypts the encrypted cookie with the private key of the asymmetric crypto-key pair or the symmetric key, and then separates the signature, i.e. the signed user's ID and any applicable other status information, from the remainder of the cookie, i.e. the unsigned user's ID and any applicable other status information. The web server verifies that the signature corresponds to the remainder of the cookie, for example, by hashing the remainder of the cookie, i.e. the unsigned user's ID and any applicable other status information, using the same hash algorithm and hash key as was used to build the signature, and compares the hash result to the signature. If the user is authenticated, e.g. by matching this later hash result generated by the web server to the signature included in the decrypted cookie, the web server uses the unsigned user ID which is included in the decrypted cookie to identify customized information.

This customized information may then be provided to the user either via a web page sent by the web server to the user's device, or via an out of band communication such as by transmitting a recording of the user's voice, a favorite song, a prerecorded message, etc. to the user's mobile telephone. Authentication of the web server to the user is based on the user's perception of the customized information, whether conveyed to the user in a customized web page displayed on the user's device or via an out of band communication.

If the user cannot be authenticated, e.g. because the hash result generated by the web server does not match the signature included in the decrypted cookie, the web server may deny access to some or all of the website. If the web server cannot be authenticated, e.g. because the expected customized information is not presented to the user, the user should not trust the web server and is on notice that the user's credentials, i.e. the encrypted cookie, have been phished.

This solution may help prevent a sophisticated attacker from impersonating a user from a network device, other than the user's network device, using a forged cookie, since the encrypted cookie should normally be very difficult, if not impossible, for even a sophisticated attacker to reconstruct.

The inclusion of customized information in the requested web page can also assist in authenticating the web server to the user, and therefore provide the user with an early notification that the user's credentials, including the encrypted cookie, have been phished by an imposter website, if the web server cannot be authenticated.

However, there are practical and other problems with this proposed technique. One is that it relies on the user's detection of whether or not a presented web page or other customized information to the user conforms with an expected customized information, to authenticate the web server to the user. Also, it requires a change in user behavior, i.e. the user no longer enters the user's ID and password to login, so the user must be made aware of the change and migration to the proposed technique is not transparent to the user. Furthermore, showing images and playing audio to the user to authenticate the website have not only the obvious problems of user-training and migration, but also are operationally complex. For instance, what happens when the user sees a genuine page served up from a different part of the infrastructure that does not use the expected images? In this regard, a bank might aggregate services from several service providers. What happens when one of the service providers implements images, but another one does not?

True Protection Against MITM And Impostor Website Attacks Using Multifactor Split Key Asymmetric Cryptography In order to have true protection against phishing, the authentication must be end to end and there must be nothing that an attacker can capture using either an MITM attack or imposter website that can be used by the attacker to demonstrate knowledge of the credentials required to impersonate the real user in subsequent authentications to a real website. Thus, for true protection against phishing attacks, even if the attacker persuades the user to divulge user credentials or otherwise gains access to user credentials, or gains access to the user's network device, the attacker will not be able to reuse the user's credentials or operate the user's device to impersonate the user.

A system has recently been developed which provides true protection against phishing attacks.

More particularly, as for example disclosed in U.S. application Ser. No. 11/055,987, filed Feb. 14, 2005, and entitled "Architecture For Crypto-key Storage", Tricipher, Inc, the assignee of all rights in the present application, has developed an asymmetric cryptosystem in which users are associated with an asymmetric crypto-key pair having a public key and a private key, at least one of which, e.g. the private key, is split into multiple key portions, e.g. multiple private key portions. As in the conventional split key asymmetric cryptosystems discussed above, each of the key portions can be applied to an original message separately or in sequence and the partial results combined to form a transformed, i.e. encrypted, message, and the other key, e.g. the public key, can be applied to the transformed message to verify authenticity of the message preferably by recovering the original message, which authenticates the user. Conversely a message transformed, i.e. encrypted, with the other key, e.g. the public key, can be decrypted by applying each of the split key portions, e.g. the private key portions, to the transformed message separately or in sequence and the partial results combined to decrypt the original message.

However, unlike the other split key asymmetric cryptosystems, the Tricipher system can generate at least one of the multiple key portions of the asymmetric crypto-key using one or more pieces of information, known as factors. For purposes of the following discussion, we will assume that the private key is split and that a first private key portion of the asymmetric crypto-key is generated using the one or more factors. If multiple factors are used, two, three, or even a greater number of factors can be used, as may be desired under the circumstances. In any event, each of the factors is under the control of a single entity. That is, a single entity has possession of, or free access to, each of the one or more factors. For purposes of the following discussion, we will assume that that the entity associated with the first private key portion is a user. Thus, the first private key portion could be $D_{aa}$.

A factor could be as simple as a readily available number string, such as a serial number of a user's computer, or could be a sophisticated algorithm, such as a cryptographic key. Preferably, one of the factors corresponds to the user's password. If each of multiple factors is a number string, generation of the first private key portion could be accomplished by simply concatenating the multiple factors. However, preferably the first private key portion is generated by cryptographically combining the multiple factors, and each of the multiple factors is, or is used to produce, a cryptographic key. Thus, cryptographic keys are beneficially used to produce a cryptographic key.

The first private key portion is never stored in a persistent state. That is, the first private key portion must be generated whenever its use is desired. The first private key portion may be immediately destroyed after its initial use, or may continue to be stored temporarily after its initial use, e.g. after being used in authenticating the user for purposes of initial session login, making it available for use multiple times, e.g. for use in authenticating the user for purposes of logging-in to other network sites or other web pages after initial session login, before it is destroyed. For example, the first private key portion may be temporarily stored during a predetermined time period or for use a predetermined number of times, i.e. for use in proving the user's identity multiple times without the user providing any other authentication information or recreation of the first private key portion.

Another of the multiple private key portions of the asymmetric crypto-key, which will be referred to as the second private key portion for purposes of this discussion, is under control of another entity, in this case an entity other than the applicable user, e.g. a secure server or another user. Thus, the second private key portion could be $D_{as}$. This second private key portion may be stored in a persistent state. In this example, it is assumed that the first and second private key portions of the asymmetric crypto-key are combinable to form a complete private key $D_{alice}$. This private key is usable to transform, e.g. encrypt or decrypt, messages as may be desired under the circumstances.

The public key, commonly designated as E, is preferably stored under control of an entity other than the entity having access to the multiple factors, e.g. other than the applicable user in the above example. Thus, the public key is available to at least one other entity.

Since the first private key portion of an asymmetric crypto-key, e.g. the user's private key portion, is generated using one or more factors, each of these factors will be under the control of the applicable entity, e.g. that user. If multiple factors are used, preferably some, but not all, of the multiple factors used to generate the first private key portion are stored, with each stored in a different location.

For example, if one of the factors corresponds to the user's password, preferably neither the user's password nor the corresponding factor, if different than the password, is stored, except temporarily, e.g. on random access memory (RAM) of the user's terminal. That is, neither the password nor the factor corresponding thereto is ever persistently stored anywhere on the network. If the factor is different than the password, the password is temporarily stored only for the time necessary to allow for generation of the corresponding factor after the user enters the password. If multiple factors are used, or the corresponding factor alone is used to derive the first private key portion, the corresponding factor is temporarily stored only for the time necessary to allow for generation of the first private key portion. If the corresponding factor is the only factor and itself serves as the first private key portion, it is temporarily stored as discussed above with reference to the storage of the first private key portion.

On the other hand, the other of the multiple factors may be stored persistently, preferably in different non-volatile memory devices. Thus, if there are two other factors, these later two factors are preferably stored separately at different locations. This adds a level of security, in that a thief would have to infiltrate two locations to steal both of these factors. In this regard, one of these later factors may be stored on either a user's network device or removable media configured to communicate with the user's network device. As will be recognized by those skilled in the art, the user's network device could be a personal computer (PC), other personal computing device, such as a personal digital assistant (PDA), mobile phone or some other type computing device, and the removable media could be a USB flash drive, smart card, floppy disk, compact disk (CD), IPOD or some other type of portable data storage device. A factor stored on a user's network device is sometime referred to as $D_{tether}$ and a factor stored on removable media is sometime referred to as $D_{USB}$.

The factor $D_{tether}$ is preferably the private key of a private-public asymmetric key pair, including $D_{tether}$ and $E_{tether}$, and having a modulus $N_{tether}$. The factor $D_{USB}$ is preferably the private key of a private-public asymmetric key pair, including is $D_{USB}$ and $E_{USB}$, and having a modulus $N_{USB}$. For example, each of $D_{tether}$ and $E_{tether}$ and/or $D_{USB}$ and $E_{USB}$ may form a conventional RSA private-public asymmetric key pair.

In the most common implementation, $D_{tether}$ is stored securely on the hard disk of a user's PC using the protection capabilities provided by the PC's operating system, preferably as a non-exportable private key in a Windows Operating System key-store. Of course, as desired, $D_{tether}$ could be stored in a Windows Operating System registry. Alternatively, $D_{tether}$ can be, as desired, stored on the trusted processing module (TPM). No matter where or how on the user's computing device $D_{tether}$ is stored, in the most basic configuration, $D_{tether}$ can only be used from the user's computing device upon which it is stored. That is, $D_{tether}$ is a non-exportable private key stored on the user device upon which it will be used. However, the multifactor split private key asymmetric cryptosystem developed by Tricipher, Inc. also facilitates porting $D_{tether}$ to other devices for use thereon.

$D_{USB}$, which is stored on removable media, also needs to be protected, since storing any kind of key in the clear should be avoided if possible. In the case of $D_{USB}$ this is particularly important because if $D_{USB}$ is stored on the removable media in clear and should the user misplace or otherwise lose the removable media, an attacker could easily access, extract and/or copy $D_{USB}$ from the removable media, and potentially use $D_{USB}$ to impersonate the user. Thus, in the multifactor split key asymmetric cryptosystem developed by Tricipher Inc., $D_{USB}$ is beneficially stored on the removable media in an encrypted state.

The non-private parts of the generated keys, i.e., $E_{tether}$, $N_{tether}$, $E_{USB}$, and $N_{USB}$, are stored under control of the other entity controlling storage of the second private key portion, e.g. a secure server or another user.

In summary, the exemplary split key asymmetric cryptosystem described above and disclosed in more detail in the above referenced application, uses asymmetric cryptography with an asymmetric crypto-key pair $D_{alice}$, $E_{alice}$ with $D_{alice}$ split into $D_{aa}$ and $D_{as}$ resulting in three keys, $D_{aa}$, $D_{as}$ and $E_{alice}$. To return to the starting point, all keys must be used. So in a three key system:

```
Encrypt {Message, D_aa} => Intermediate_CipherText
Encrypt {Intermediate_CipherText, D_as} => CipherText
Decrypt:{CipherText, E_alice} => Message
```

Every user has an associated set $\{D_{aa}, D_{as}, E_{alice}\}$ where: $D_{aa}$ is kept private and only in possession of the user, $D_{as}$ is kept private and is held on the another network entity device, and $E_{alice}$ is made public. The system preferably uses the RSA algorithm and therefore whether three or more keys are used, the system can retain all the desirable security properties of the two key RSA system, while being stronger than conventional two key RSA systems in significant respects.

Additionally, because $D_{aa}$ can be derived using one or more factors, the system has the flexibility to provide multiple different levels of security within the same infrastructure.

Preferably, at the most basic level, sometimes referred to as single armoring, $D_{aa}$ is computed using only a single factor $F_p$ corresponding to the password. In single armored mode, the user is associated with a password that is input by the user and expanded using an encryption algorithm, preferably one complying with the PKCS5 IETF standard, to generate a factor. Because the password is expanded in accordance with an encryption algorithm to create the factor, the factor is sometime referred to as a 'hardened password'. In single armored mode the factor itself serves as $D_{aa}$, i.e. $D_{aa}=PKCS5(F_p)$.

At the next level, sometimes referred to as double armoring, $D_{aa}$ is computed using both the factor $F_p$ corresponding to the password and either $D_{tether}$ or $D_{USB}$. In double armor mode, each user is associated with both a password and additional asymmetric crypto-key pair $D_{tether}$, $E_{tether}$, or $D_{USB}$, $E_{USB}$ with $D_{tether}$ or $D_{USB}$ stored at the user's network device or the user's portable media. In double armored mode the $D_{aa}$ is computed as:

---

Encrypt($F_p$, $D_{tether}$ or $D_{USB}$) => intermediate_password.
PKCS5(intermediate_password) => $D_{aa}$

---

It is perhaps worthwhile to highlight here that $E_{tether}$ or $E_{USB}$ is persistently and securely stored along with the second private key portion $D_{as}$ at a security server and retrieved from this storage for purposes of authenticating the user based on a confirmation of the user's knowledge of $D_{tether}$ or $D_{USB}$ as well as $D_{aa}$.

At the next level, sometimes referred to as triple armoring, $D_{aa}$ is computed using the factor $F_p$ corresponding to the password, $D_{tether}$ and $D_{USB}$. In triple armor mode, each user is associated with a password, additional asymmetric crypto-key pair $D_{tether}$, $E_{tether}$, and additional asymmetric crypto-key pair $D_{USB}$, $E_{USB}$. $D_{tether}$ and $D_{USB}$ are stored at the user's network device and the user's portable media, respectively. In triple armored mode the $D_{aa}$ is computed as:

---

Encrypt{$F_p$, $D_{tether}$} => intermediate_password_1.
Encrypt{intermediate_password_1, $D_{USB}$} => intermediate_password_2.
PKCS5{intermediate_password_2} => $D_{aa}$.

---

In double armored and triple armored mode, knowledge of the password alone is insufficient for authentication, because additional factors are required for authentication. Furthermore, the authentication is end to end, and there is nothing that a attacker's website can capture which will give the attacker knowledge of all the credentials necessary for authentication because the protocols require the attacker to demonstrate possession of credentials that are not actually transmitted to the imposter website but are required to construct the cryptographic keys used to establish the credentials. Thus, even if the attacker is able to set up a website that looks like the intended website or launch as successful MITM attack, the attacker will at best only be able to obtain and demonstrate possession of the crypto-key credentials, but not the underlying credentials necessary to construct the applicable key, and therefore will not be able to successfully impersonate the user in subsequent authentications. Because of all this, double and triple armored mode can provide true phishing protection.

On the other hand, unlike the double and triple armored modes, each of which requires a small client footprint, i.e. requires downloading, storage and/or execution of a small number of additional executable instructions onto the user's network device, the single armored mode does not provide true protection against phishing attacks. Thus, the single armored mode offers a zero footprint solution, i.e. can be implemented without requiring the downloading, storage or execution of additional executable instructions onto the user's network device, with simpler password policies that eliminates the possibility of catastrophic dictionary failure. However, it provides little protection against phishing.

In general, those skilled in the art consider any solution without a client footprint to be vulnerable to impostor websites and MITM attacks of even mediocre sophistication. As a consequence, if a potential user or user's sponsor wants true phishing protection, then a cryptographically sound solution with a client footprint is required. The double or triple armored modes provide just such a solution.

However, a problem arises if true protection against phishing, or something closer to true protection than that provided by the previously proposed encrypted cookie technique or single armored mode described above, is desired but, at the same time, the user or sponsor will not accept any solution with a client footprint. Indeed, today users or sponsors of users often restrict their security solution to one that has no client footprint. In such cases, the problem has generally been considered insurmountable, and therefore a large segment of the user population lacks true phishing protection.

Accordingly a need exists for a zero footprint technique which offers stronger protection against phishing.

OBJECTIVES OF THE INVENTION

It is an object of the present invention to provide a zero footprint technique that can provide enhanced phishing protection. It is also an object of the present invention to overcome at least some of the deficiencies of other zero footprint techniques that have been proposed to address the problem of phishing. Additional objects, advantages, novel features of the present invention will become apparent to those skilled in the art from this disclosure, including the following detailed description, as well as by practice of the invention. While the invention is described below with reference to a preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with a networked implementation of the present invention, a system having multiple network stations, each of which could be any type of network device capable of performing in the required manner, is provided for establishing credentials useable to authenticate a user of a communications network, such as the Internet or some other public or private communications network, using split key asymmetric cryptography, which we sometimes characterize as augmented single factor split key asymmetric cryptography.

The system includes a network station, associated with the user, configured with logic which could take the form of programmed software instructions or some other form, to transmit a first value via the network. The first value is sometimes characterized as a factor F and represents a first user credential. The first value preferably corresponds to the user's password and could, for example, be the user's password itself or some function, such as a hash, of the user's password. If the first value corresponds to the user's password we sometime characterize it as a factor $F_p$.

A network station, associated with an authenticating entity such as a sponsor or distinguished entity, is configured with logic to generate a first key portion based on the transmitted first value and a second value unknown to the user. The second value is sometimes characterized as an augmenting factor $F_{ak}$, and will represent a second user credential. The second value could take the form of a private or public key of an augmenting asymmetric crypto-key, an augmenting symmetric crypto-key, an augmenting random character string, or some other form. Preferably, the first key portion is generated using the PKCS-5 algorithm, although this is not mandatory. For example, if factor $F_p$ is transmitted by the user network station, the PKCS-5 algorithm is used, and the private key $D_U$ of a user asymmetric crypto-key having a private key $D_U$ and public key $E_U$, such as an RSA or some other type of asymmetric crypto-key, is to be split into a first key portion and a second key portion, the first key portion, which we will call $D_{U1}$, can be computed by $D_{U1}$=PKCS-5 (sign $\{F_p, F_{ak}\}$, salt, iteration count).

Knowing the private key $D_U$ and the public key $E_U$ of a user asymmetric crypto-key, the authenticating entity network station is also configured to split the one key, in this case the private key $D_U$, by computing the second key portion, which we will call $D_{U2}$. More particularly, after the first key portion $D_{U1}$ has been computed, the authenticating entity network station uses the relationship $D_{U1}*D_{U2}=D_U \mod \Phi(N)$ to compute the second key portion $D_{U2}$.

The authenticating entity network station is also configured to store the second key portion, e.g. $D_{U2}$, of the one key, e.g. $D_U$, of the user asymmetric crypto-key e.g. $D_U, E_U, N_U$, so as to be accessible only to the authenticating entity network station. The second key portion, e.g. $D_{U2}$, may be stored in any type of data store. For example, the second key portion, e.g. $D_{U2}$, may be stored in a database located on a hard disk or some other type of data storage device accessible at or to the authenticating entity network station.

The authenticating entity network station is also configured to generate a cookie, which we sometimes characterize as a cookie message, including the second value, e.g. the augmenting factor $F_{ak}$, and to transmit the generated cookie via the network. The user network station is further configured to store, typically by executing a brower, the transmitted cookie as is well understood by those skilled in the art. The transmitted cookie with the second value, e.g. $F_{ak}$, may be stored in any type of data store.

The authenticating entity network station is also configured to destroy the transmitted first value, e.g. the factor $F_p$, the second value, e.g. the augmenting factor $F_{ak}$, the one key of the user asymmetric crypto-key, e.g. $D_U$, and the first key portion of the one key of the user asymmetric crypto-key, e.g. $D_{U1}$.

After transmission of the cookie and destruction, neither the first value, e.g. the factor $F_p$, nor the second value, e.g. the augmenting factor $F_{ak}$, nor the first key portion of the one key of the user asymmetric crypto-key, e.g. $D_{U1}$, nor the one key of the user asymmetric crypto-key, e.g. $D_U$, is accessible to the authenticating entity network station. Furthermore, neither the first key portion of the one key of the user asymmetric crypto-key, e.g. $D_{U1}$, nor the one key of the user asymmetric crypto-key, e.g. $D_U$, is accessible to the user network station;

The first value, e.g. the factor $F_p$, which represents a first user credential, and the second value, e.g. the augmenting factor $F_{ak}$, included in the transmitted cookie, which represents a second user credential, if subsequently transmitted by the user network station to the authenticating entity network station, are useable by the authenticating entity network station to authenticate the user.

Beneficially, the authenticating entity network station is further configured to encrypt the second value, e.g. the augmenting factor $F_{ak}$, prior to generating the cookie, so that the second value included in the generated cookie is the encrypted second value. The second value may be encrypted with one of a private key and a public key of another asymmetric crypto-key, which is advantageously a rolling asymmetric crypto-key having a private key $D_R$ and a public key $E_R$. Alternatively, the second value may be encrypted with a symmetric crypto-key, which is advantageously a rolling symmetric crypto-key. If a rolling asymmetric crypto-key is used, the second value could, for example, be encrypted with $D_R$. Additionally, if a rolling asymmetric crypto-key is used the authenticating entity network station is further configured to destroy the one key of the other asymmetric crypto-key, e.g. $D_R$, and store the other key of the other asymmetric crypto-key, e.g. $E_R$, so as to be accessible only to the authenticating entity network station. After transmission of the generated cookie and destruction, the one key of the other asymmetric crypto-key, e.g. $D_R$, is not accessible to the authenticating entity network station. On the other hand, if a rolling symmetric crypto-key is used, the second value could, for example, be encrypted with $K_R$. Additionally, if a rolling symmetric crypto-key is used the authenticating entity network station is further configured to store the symmetric crypto-key, e.g. $K_R$, so as to be accessible to the authenticating entity network station.

BRIEF DESCRIPTION OF DRAWINGS

FIGS. 10A-10B depict relational databases for storing data in accordance with different implements of the first embodiment of the present invention.

PREFERRED EMBODIMENT OF THE INVENTION

The Network Architecture

Figure 1:
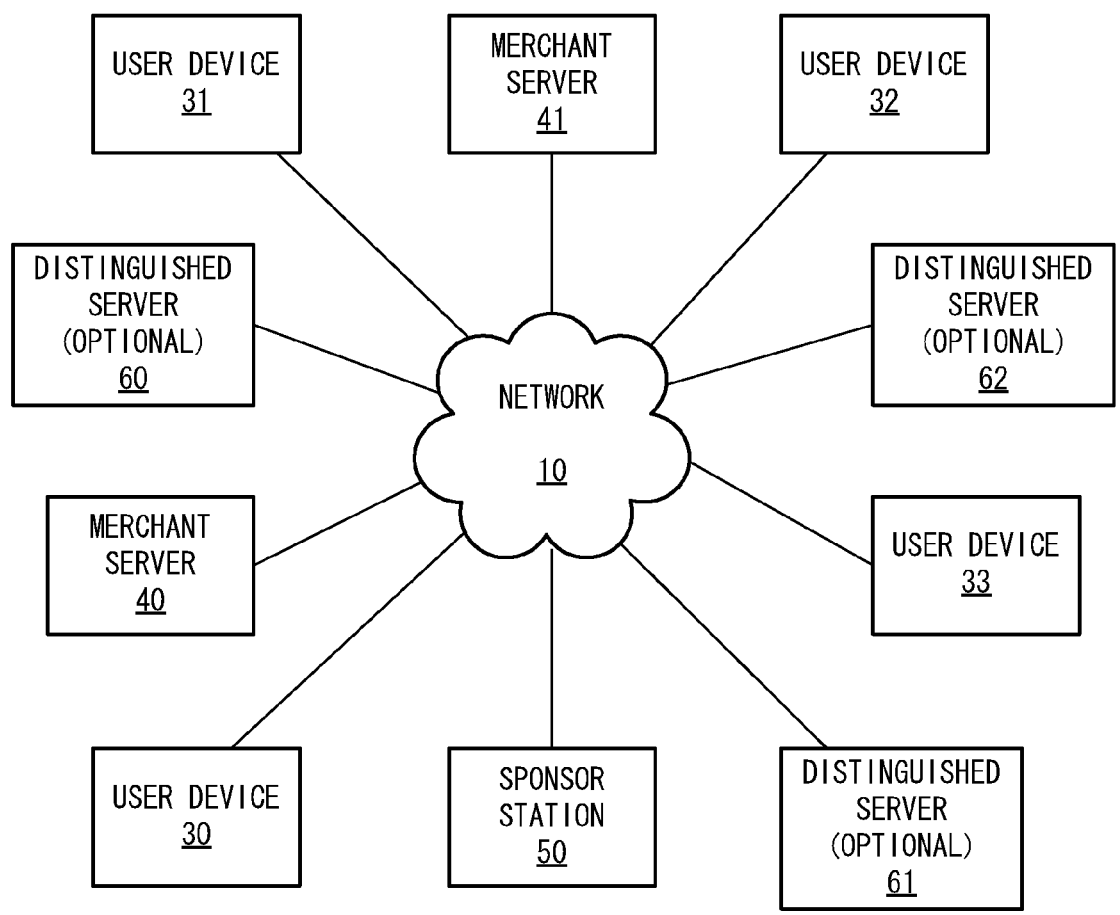
FIG. 1 depicts an exemplary network, including networked devices associated with users, a sponsor, merchants, and optional distinguished entities, in accordance with the present invention.

FIG. 1 illustrates a network 10, which could be the Internet or another public or private network. As shown, the network 10 includes multiple network devices interconnected so as to be capable of communicating with each other. These network devices include network devices 30-33 associated with individual users, network devices 40-41 associated with merchants, a network device 50 associated with a sponsor, and optional network devices 60-62 associated with entities known to and trusted by the sponsor. These later entities are sometimes referred to as distinguished entities.

User network devices 30-33 are typically personal computers, but could be other types network devices. Merchant network devices 40-41 could be associated with any type entity having a presence, e.g. a web page, on network 10, and typically take the form of network, e.g. Internet, servers. Accordingly, the merchant network devices 40-41 will sometimes be referred to as merchant servers. The sponsor network device 50 also typically takes the form of a network server, and will sometimes be referred to as a sponsor server or sponsor station. Likewise, the optional distinguished entity network devices 60-62 typically take the form of network servers. Accordingly, the optional distinguished entity network devices 60-62 will sometimes be referred to as distinguished servers. It will be understood that a network may consist of more network devices than depicted in FIG. 1.

The User Network Device

Figure 2:
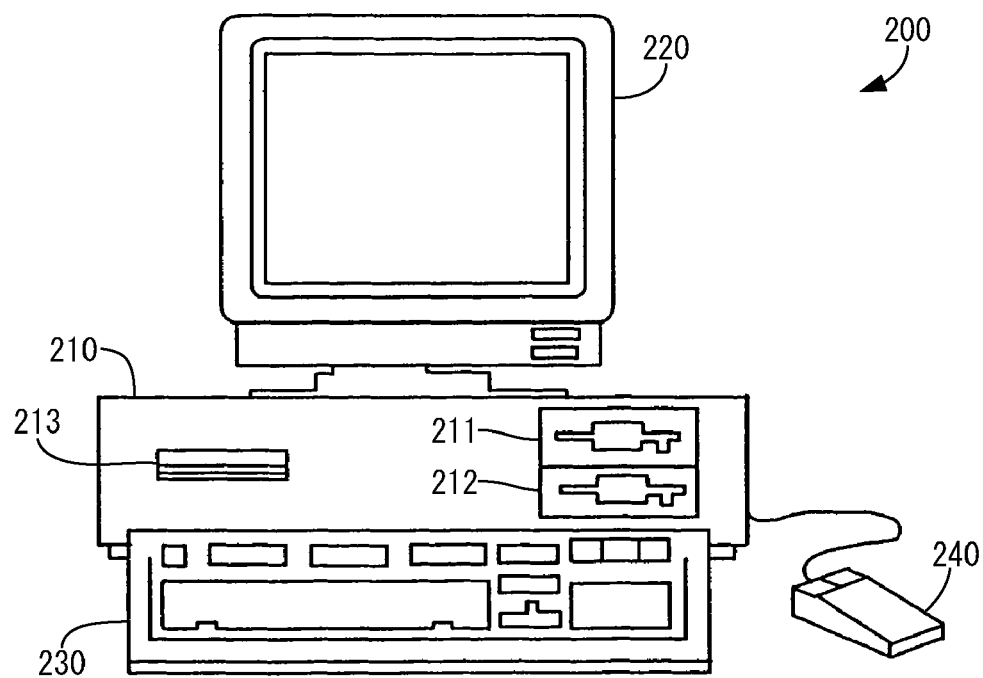
FIGS. 2 depicts a computer suitable for use by a user to access a network, in accordance with the invention.
Figure 3:
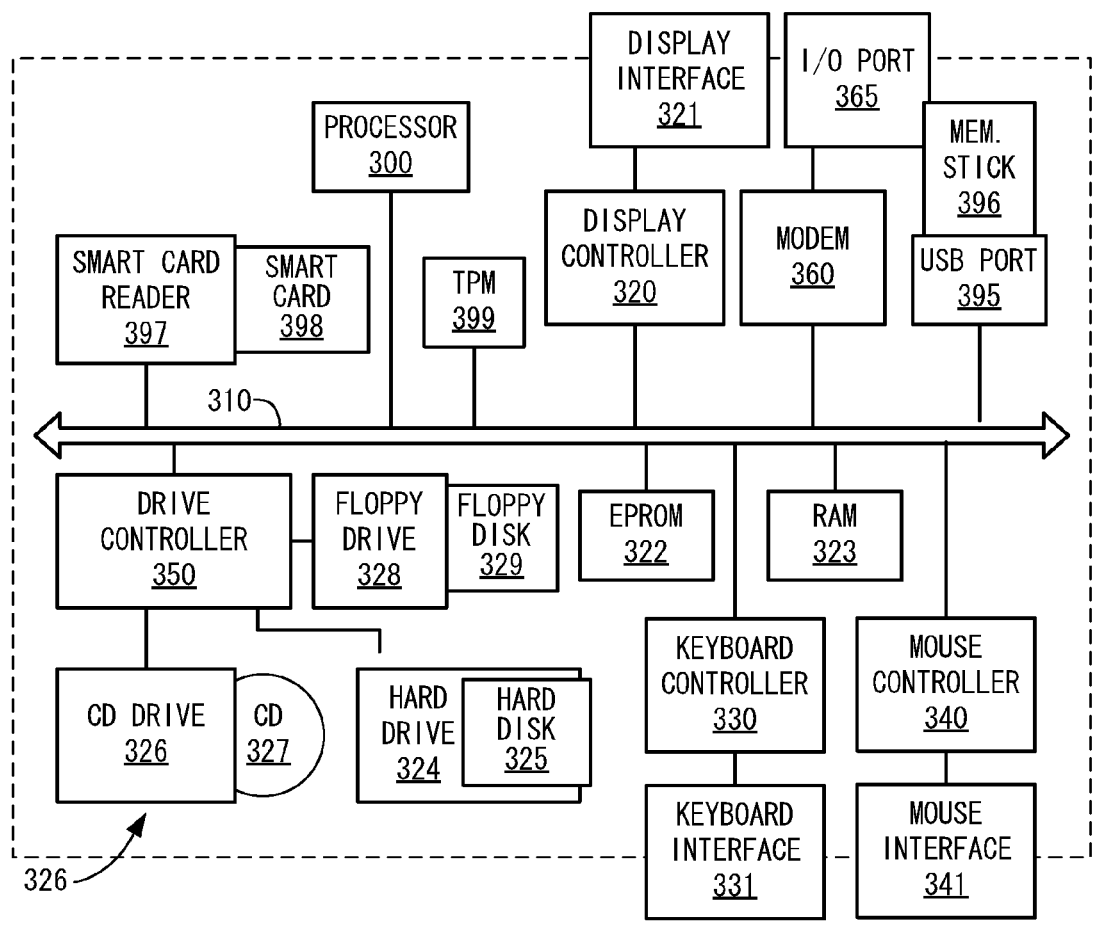
FIG. 3 is an exemplary block diagram of components of the computer depicted in FIG. 2.

FIGS. 2 and 3 depict an exemplary personal computer (PC) suitable for use by an individual user as a user network device 30-33 to access the network 10. The PC is preferably a commercially available personal computer. It will be recognized that the PC configuration is exemplary, and that other components (not shown) could be added or substituted for those depicted and certain of the depicted components could be eliminated if desired. Further, a user device 30-33 could be another type device, i.e. a device other than a computer, such as, but not limited to, a personal digital assistant (PDA) or a mobile phone, e.g. cellular or other type wireless communications device.

The PC or other type user network device functions in accordance with stored programmed instructions, which are sometimes characterized as logic, that are executed, drive its operation. Preferably, the computer stores its programmed instructions on an EPROM, or hard disk. It will be recognized that only routine programming is required to implement the instructions required to drive the computer to operate in accordance with the invention. Further, since the computer components and configuration are well understood by those skilled in the art, routine operations performed by depicted components will generally not be described, such operations also being well understood in the art.

Referring to FIG. 2, the computer 200 includes a main unit 210 with slots 211, 212, and 213, respectively provided for loading programming or data from a floppy disk, compact disk (CD), or other removable media, onto the computer 200. The computer 200 also includes a keyboard 230 and mouse 240, which serve as user input devices. A display monitor 220 is also provided to visually communicate, i.e. display, information to the user.

As depicted in FIG. 3, the computer 200 has a main processor 300 which is interconnected via bus 310 with various remote or local storage devices which may include, but are not limited to, erasable programmable read only memory (EPROM) 322, read only memory (RAM) 323, hard drive 324, which has an associated hard disk 325, CD drive 326, which has an associated CD 327, floppy drive 328, which has an associated floppy disk 329, USB port 395 for connecting a universal serial bus (USB) drive 396 (often called a flash drive or memory), and smart card reader 397 for communicating with a smart card 398. Also shown in FIG. 3 is a trusted processing module (TPM) 399 for securely storing cryptographic keys. Taken together, the remote and local storage devices will be referred to collectively as storage devices 370.

A drive controller 350 controls the hard drive 324, CD drive 326 and floppy drive 328. Also depicted in FIG. 3 is a display controller 320 interconnected to display interface 321, a keyboard controller 330 interconnected to keyboard interface 331, a mouse controller 340 interconnected to mouse interface 341 and a modem 360 interconnected to I/O port 365, all of which are connected to the bus 310. The modem 360 and interconnected I/O port 365, serve as a network interface, and are used to transmit and receive signals via the network 10 as described herein. Those skilled in the art will recognize that another type of network interface could be easily substituted for that shown. It should also be understood that, if desired, other components could be connected to the bus 310, or that less than all the components shown in FIG. 3 could be connected to the bus 310. By accessing and executing the stored computer programming, i.e. the stored programmed instructions, the processor 300 is driven to operate in accordance with the present invention.

The Sponsor, Merchant And/Or Distinguished Entity Network Device

As noted above, the sponsor network device 50, each merchant network device 40-41 and each optional distinguished network device 60-62 is typically represented on network 10 by a network server. However, here again, any network compatible device which is capable of functioning in the described manner could be utilized in lieu of a server to represent the associated entity, i.e. the sponsor, each merchant and/or each optional distinguished entity, on the network.

Figure 4:
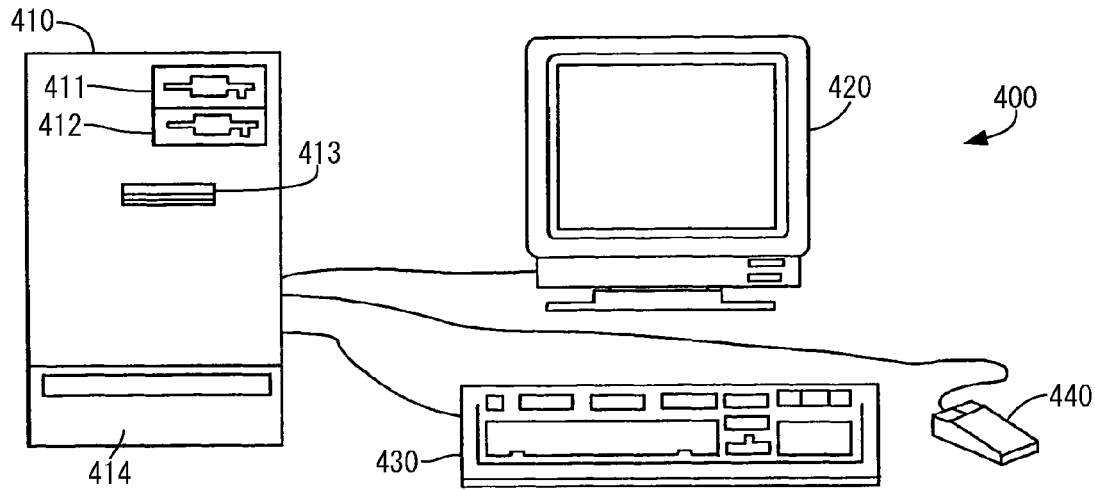
FIG. 4 depicts a server suitable for use by a sponsor, a merchant, and/or an optional distinguished entity, in accordance with the present invention.
Figure 5:
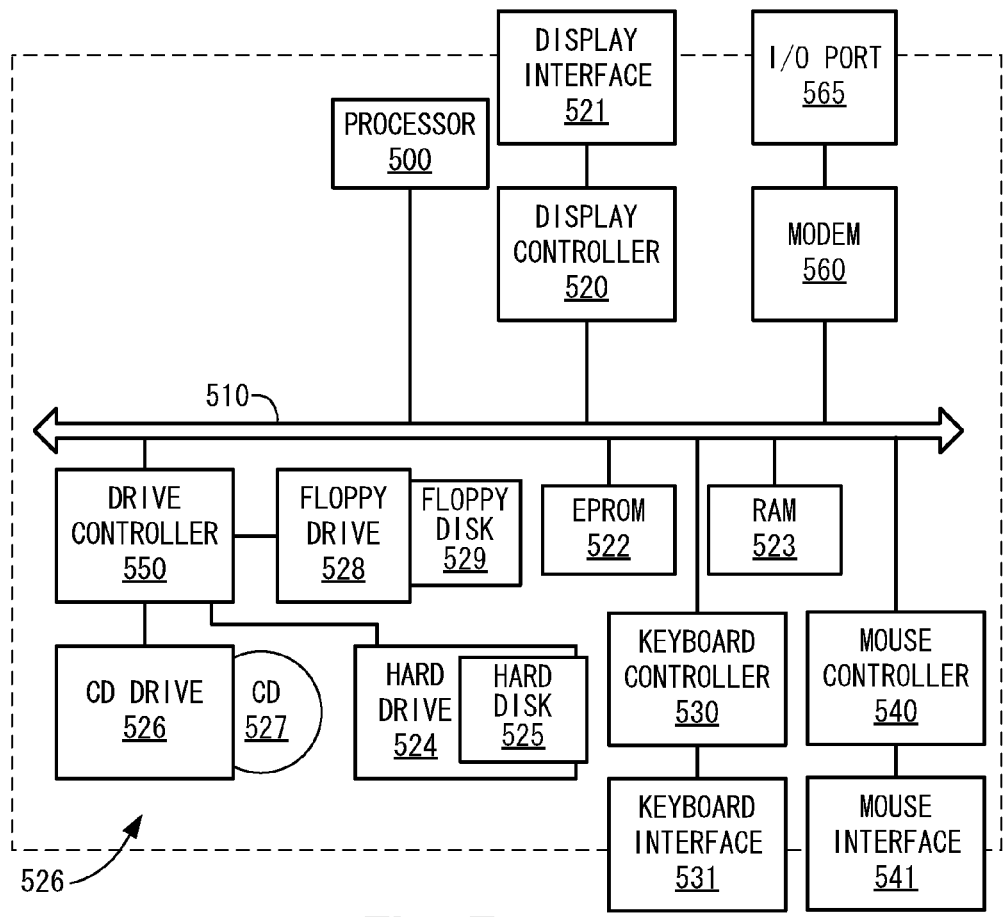
FIG. 5 is an exemplary block diagram of components of the server depicted in FIG. 4.

FIGS. 4 and 5 depict an exemplary network server suitable for use by the sponsor, merchants, and optional distinguished entities to access the network 10 in accordance with the invention. The server is preferably a commercially available, high power mini-computer or mainframe computer. Here again, it will be recognized that the server configuration is exemplary, and that other components (not shown) could be added or substituted for those depicted and certain of the depicted components could be eliminated if desired.

The server functions as described below in accordance with stored programmed instructions, i.e. logic, which drive its operation. Preferably, the server stores its unique programmed instructions on an EPROM or hard disk. It will be recognized that only routine programming is required to implement the instructions required to drive the server to operate in accordance with the invention. Further, since the server components and configuration are well understood to those skilled in the art, routine operations performed by depicted components will generally not be described, such operations also being well understood in the art.

Referring to FIG. 4, the server 400 includes a main unit 410 with slots 411, 412, 413 and 414, respectively provided for loading programming or data from a floppy disk, CD and/or hard disk onto the server 400. The server 400 also includes a keyboard 430 and mouse 440, which serve as user input devices. A display monitor 420 is also provided to visually communicate, i.e. display, information to the applicable entity. As depicted in FIG. 5, the server 400 has a main processor 500 which is interconnected via bus 510 with various storage devices including EPROM 522, RAM 523, hard drive 524, which has an associated hard disk 525, CD drive 526, which has an associated CD 527, and floppy drive 528, which has an associated floppy disk 529. The memories, disks and CD all serve as storage media on which computer programming or data can be stored for access by the processor 500. The stored data includes one or more databases containing information associated with network users or other network entities. Taken together, the storage devices will be referred to collectively as storage devices 570.

A drive controller 550 controls the hard drive 524, CD drive 526 and floppy drive 528. Also depicted in FIG. 5 is a display controller 520 interconnected to display interface 521, a keyboard controller 530 interconnected to keyboard interface 530, a mouse controller 540 interconnected to mouse interface 541 and a modem 560 interconnected to I/O port 65, all of which are connected to the bus 510. The modem 560 and interconnected I/O port 565 serve as a network interface and are used to transmit and receive signals via the network 10 as described herein. Those skilled in the art will recognize that another type of network interface could be easily substituted for that shown. It should also be understood that, if desired, other components could be connected to the bus 510, or that less than all the components shown in FIG. 5 could be connected to the bus 510. By accessing the stored computer programming, the processor 500 is driven to operate in accordance with the present invention.

Overview of First Embodiment of Zero Footprint Phishing Protection Using an Augmented Single-Factor Split Key Asymmetric Cryptography As has been discussed above, today, many users and sponsors are seeking greater protection against phishing attacks, but are unwilling to accept a non-zero footprint solution. While no zero footprint solution can provide true phishing protection, a need exists for a zero footprint solution which provides stronger protection against phishing than previously proposed zero footprint techniques.

As will be described in detail below, a technique has been developed using split key asymmetric cryptography to meet this need. The technique relies on aspects of the above described two-factor split key asymmetric cryptography, i.e. double armored mode cryptography, as well as aspects of the above described single-factor split key asymmetric cryptography, i.e. single armored mode cryptography. The result is a hybrid cryptography that we refer to as augmented single-factor split key asymmetric cryptography.

As has already been described above, in split key asymmetric cryptography, at least one of the private key and the public key is split into multiple key portions. For purposes of this description it will be assumed that a private key D of an asymmetric crypto-key is split into two key portions, which will be referred to below as first private key portion $D_1$ and second private key portion $D_2$, where $D_1*D_2=D \bmod \Phi(N)$. It will also be assumed that public key E of the asymmetric crypto-key is not split, although it will be recognized that the public key E could likewise or alternatively be split, if so desired. Thus, with the split private key, ciphertext CM=Encrypt(M,E) and Decrypt(CM, $D_1*D_2$)=M.

In single factor split key asymmetric cryptography, at least one of the multiple key portions, e.g. $D_1$ and/or $D_2$, is derived from a single factor, such as a factor $F_p$ corresponding to the user's password. If the single factor corresponds to the password, it could be the password itself or some function of the password. In two-factor split key asymmetric cryptography, at least one of the multiple key portions, e.g. $D_1$ and/or $D_2$, is derived from two factors, such as from a factor $F_p$ corresponding to the user's password and another factor, for instance the above described $D_{tether}$ and $D_{USB}$.

As noted previously, the above described multifactor split key asymmetric cryptography provides true protection against phishing. However, because the necessary logic is not normally available on systems in use today, multifactor split key asymmetric cryptography is typically a non-zero footprint solution to the phishing problem, and therefore is not acceptable to many users and sponsors. On the other hand, while the above described single factor split key asymmetric cryptography and proposed encrypted cookie technique can be implemented with a zero footprint and therefore are acceptable to such users and sponsors, the protection provided against phishing is weak. Additionally, the proposed encrypted cookie technique has other problems as noted above.

Thus, the question is how to strengthen the protection against phishing attacks beyond that provided by single factor split key asymmetric cryptography and proposed encrypted cookie technique, while maintaining a zero footprint, i.e. without requiring that additional programmed executable instructions be downloaded to, stored on or executed by the user's network device.

As will be further describe below, we do this by utilizing an augmenting factor stored in a cookie on the user's network device, in lieu of a second factor such as the above described $D_{tether}$ and $D_{USB}$ to augment the single factor and thereby enhance the protection against phishing.

For purposes of this description, the entity associated with the first private key portion $D_1$ will be referred to below as a user. However, it should be understood that any or all of the individual network and distinguished entities represented on the network 10 could be associated with a split asymmetric crypto-key and hence have an associated first private key portion. Additionally, if desired, any or all of the individual network and distinguished entities represented on the network 10 could also be associated with an augmented single factor split asymmetric crypto-key.

The user is represented on the network 10 by a user network device 30, such as a PC, as has been described above. The user network device 30 will sometimes be referred to as the first network device. As will be discussed in detail below, both the single factor and the augmenting factor will be under the control of its associated user. For purposes of this description, the single factor will be assumed to correspond to the user's password, and will sometimes be referred to as $F_p$. $F_p$ may be derived from the user's password or be the user's password itself. It will be recognized that, from a security standpoint, it is generally preferable for $F_p$ to be derived from the user's password, for example using a hash function as has been described above. However, if this requires a non-zero footprint at the user's device 30, it may be unacceptable to the user or the user's sponsor. It will be assumed, for purposes of the implementation described below, that the derivation of $F_p$ from the user's password would require a non-zero footprint, which is unacceptable. Accordingly, $F_p$ will be the user's password itself in the described implementation.

The augmenting factor is preferably a crypto-key, and will sometimes be referred to as $F_{ak}$. The augmenting factor could be a symmetric or asymmetric crypto-key, but is most preferably the private or public key of an asymmetric crypto-key.

It should be recognized that the use of a factor corresponding to the user's password and an augmenting factor that is a crypto-key is not mandatory. Those skilled in the art will understand that various other types of factors could be used, if so desired. Derivation of the first private key portion $D_1$ can be accomplished in various ways. For example the first private key portion $D_1$ could be derived by simply concatenating the factor $F_p$ and the augmenting factor $F_{ak}$. However, preferably the first private key portion $D_1$ is derived by cryptographically combining $F_p$ and $F_{ak}$ using the PKCS-5 algorithm, as will be discussed in greater detail below.

The first private key portion $D_1$ is preferably never stored in a persistent state, but must be generated whenever its use is desired. The first private key portion is however non-persistently stored temporarily after being generated, so as to be usable to prove the user's identity, and facilitate authentication of the user, multiple times without the user providing any additional authentication information and without recreation of the first private key portion $D_1$. The period of this temporary storage may, for example, be limited to a predefined time period or to a predefined number of authentications.

The other private key portion, which will be referred to as the second private key portion $D_2$, is preferably stored in a persistent state under control of a network entity other than the user. This other entity could be a merchant, sponsor or distinguished entity or some other network entity, but for purposes of this discussion it will be assumed to be a sponsor represented on the network 10 by a sponsor network station 50, such as a server, as has been described above. The network device that stores the second key portion will sometimes be referred to as the second network device. The public key E is also preferably stored in a persistent state under the control of other than the user, so as to be available to at least one other entity. In some implementations, the public key E may be beneficially stored so as to be available to each and every merchant, sponsor, distinguished entity, and/or other user represented on the network 10. It should be understood that the second private key portion $D_2$ and public key E could be stored under the control of a sponsor, a merchant or a distinguished entity, or the second private key portion $D_2$ and public key E could be respectively stored under the control of a different one of a sponsor, a merchant and a distinguished entity.

In some implementations, the second private key portion $D_2$ and public key E, or some portion of the public key E, are retained by the sponsor station 50, e.g. on hard disk 525, in association with a user's identifier (UID). In these implementations it may also be beneficial for the public key E to be stored on each merchant server 40-41, e.g. on hard disk 525, and/or each user PC 30-33, e.g. on hard disk 325, in association with a user's identifier.

Key Generation Protocol-initial Generation, Distribution and Storage of an Augmenting Factor -Generation of the Augmenting Factor- Preferably the generation of the augmented single factor split asymmetric crypto-key begins with the generation of the augmenting factor. The augmenting factor $F_{ak}$ is preferably the private key $D_{ak}$ of an asymmetric crypto-key $D_{ak}$, $E_{ak}$, $N_{ak}$, which is generated by the sponsor server 400 and stored in a cookie on the hard disk 325 of the user's PC 200.

Preferably the factor $F_p$ corresponding to the user's password is never stored, except temporarily on RAM 323 of the applicable user's PC 200. Because, in the implementation being described, the factor $F_p$ is the user's password itself, the factor $F_p$ is temporarily stored on the user's PC for only the time necessary to allow $F_p$ to be transmitted, after entry by the user, from the user's PC 200 to the sponsor's server 400. It should be understood that, if the factor $F_p$ were derived from the user's password, the user's password would be temporarily stored on the user's PC for only the time necessary to allow for generation of the corresponding factor $F_p$ after the user enters the password, and the derived factor $F_p$ would be temporarily stored on the user's PC for only the time necessary to allow $F_p$ to be transmitted, after being generated, from the user's PC 200 to the sponsor's server 400.

Figure 6A:
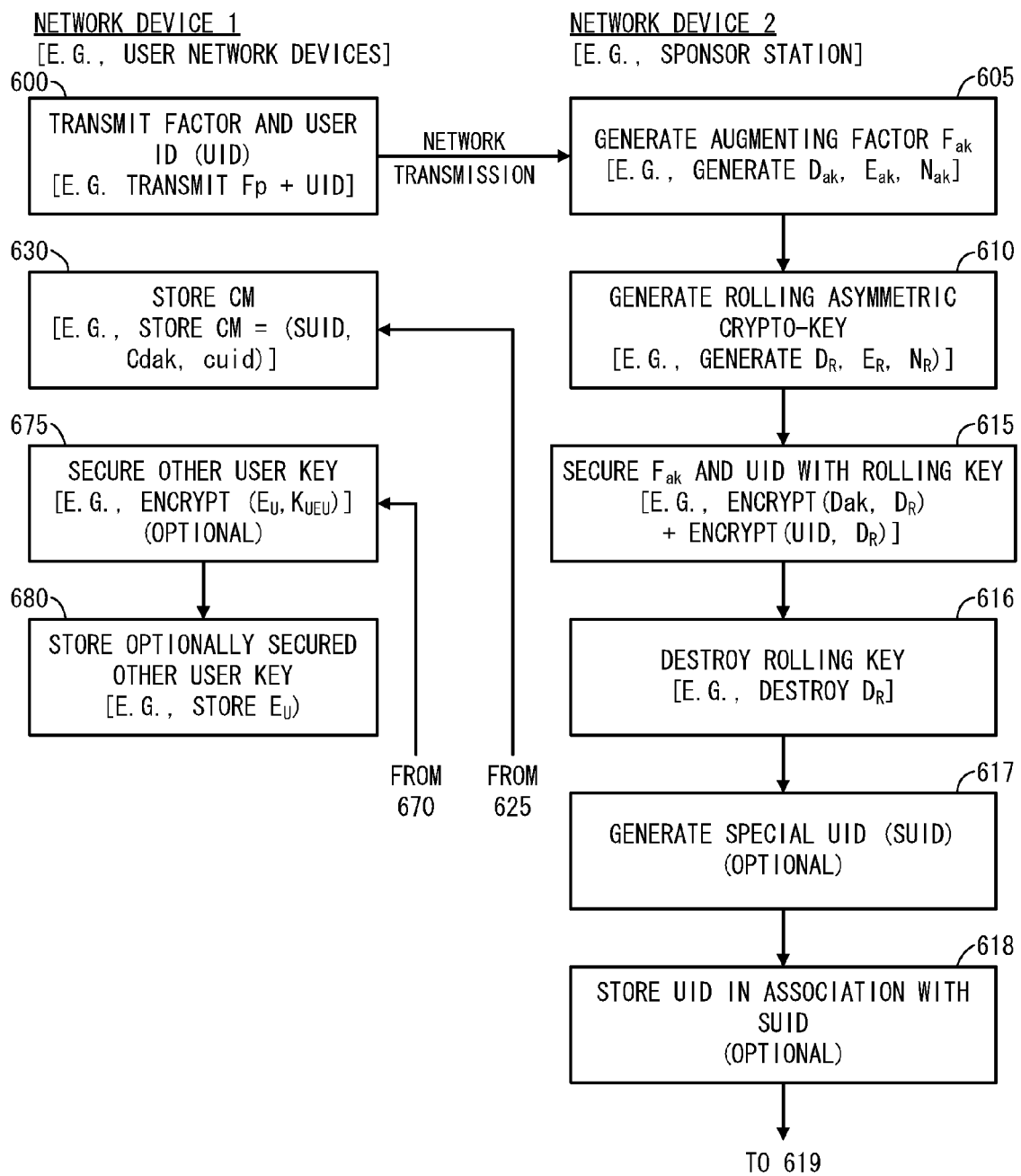
FIGS. 6A-6C depict a flow chart showing operations performed during the key generation protocol for initially generating and distributing an augmented single factor split asymmetric crypto-key with a rolling key to enhance the security of a stored augmenting factor, in accordance with a first embodiment of the present invention.
Figure 6B:
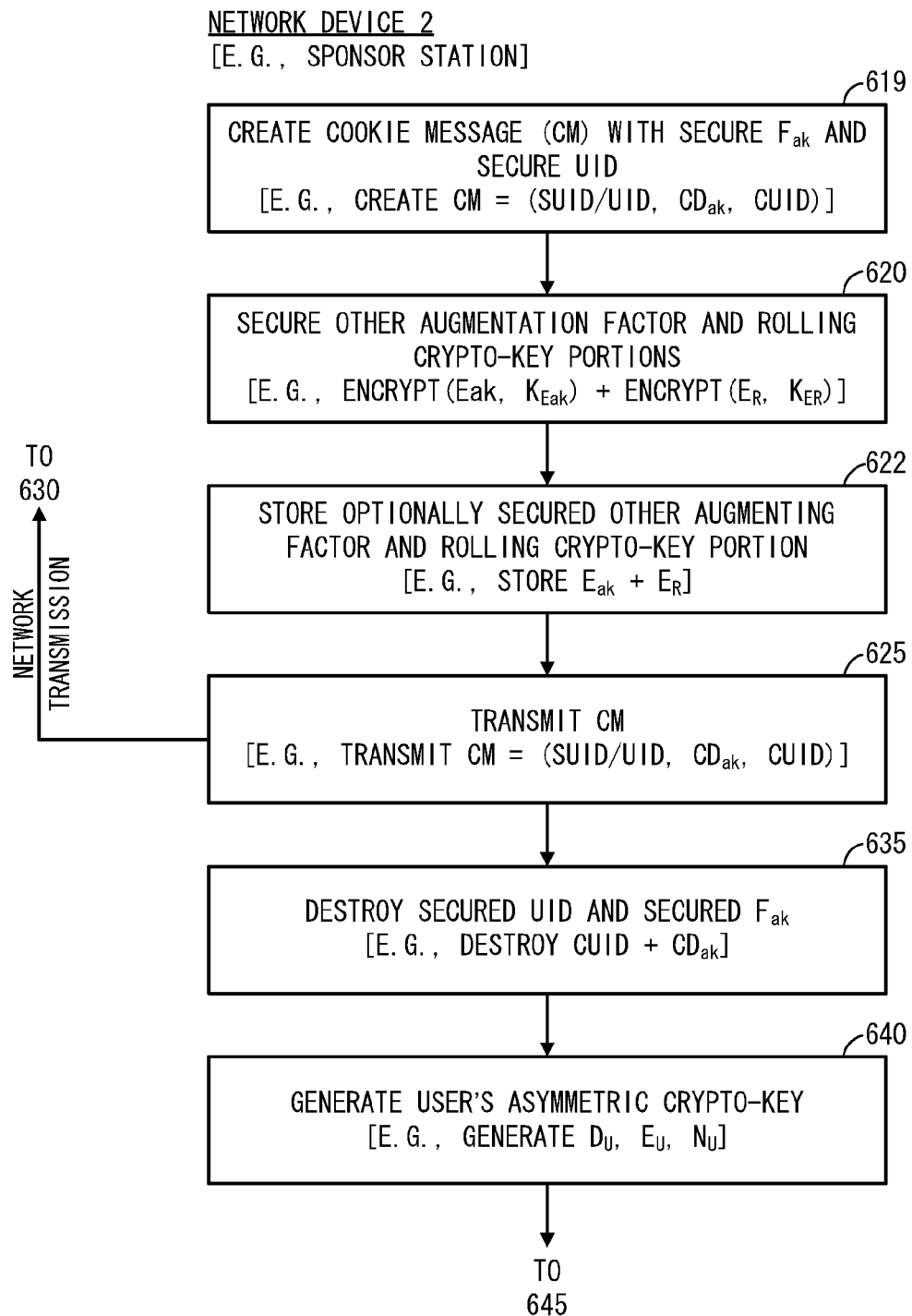
Figure 6C:
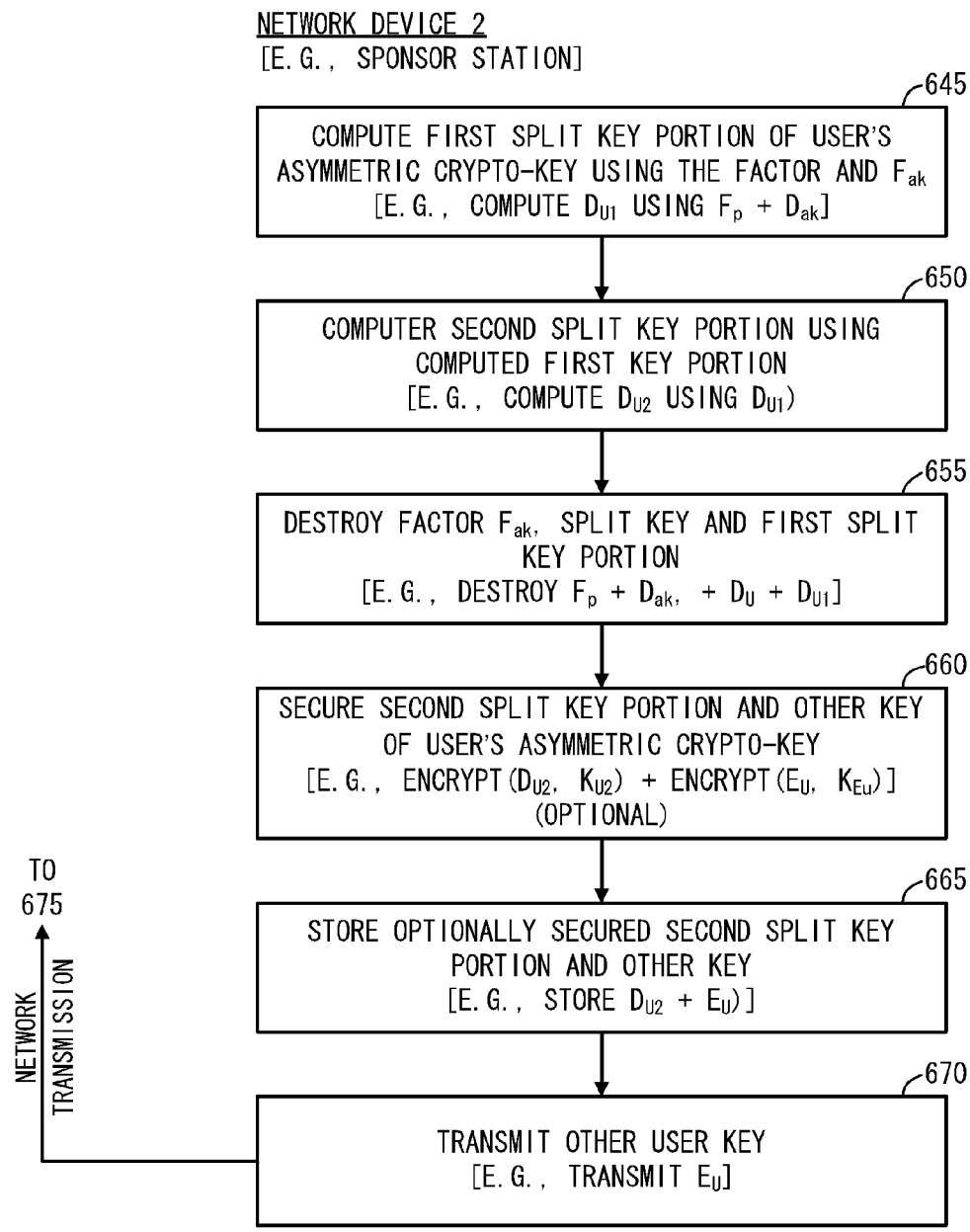
Figure 7A:
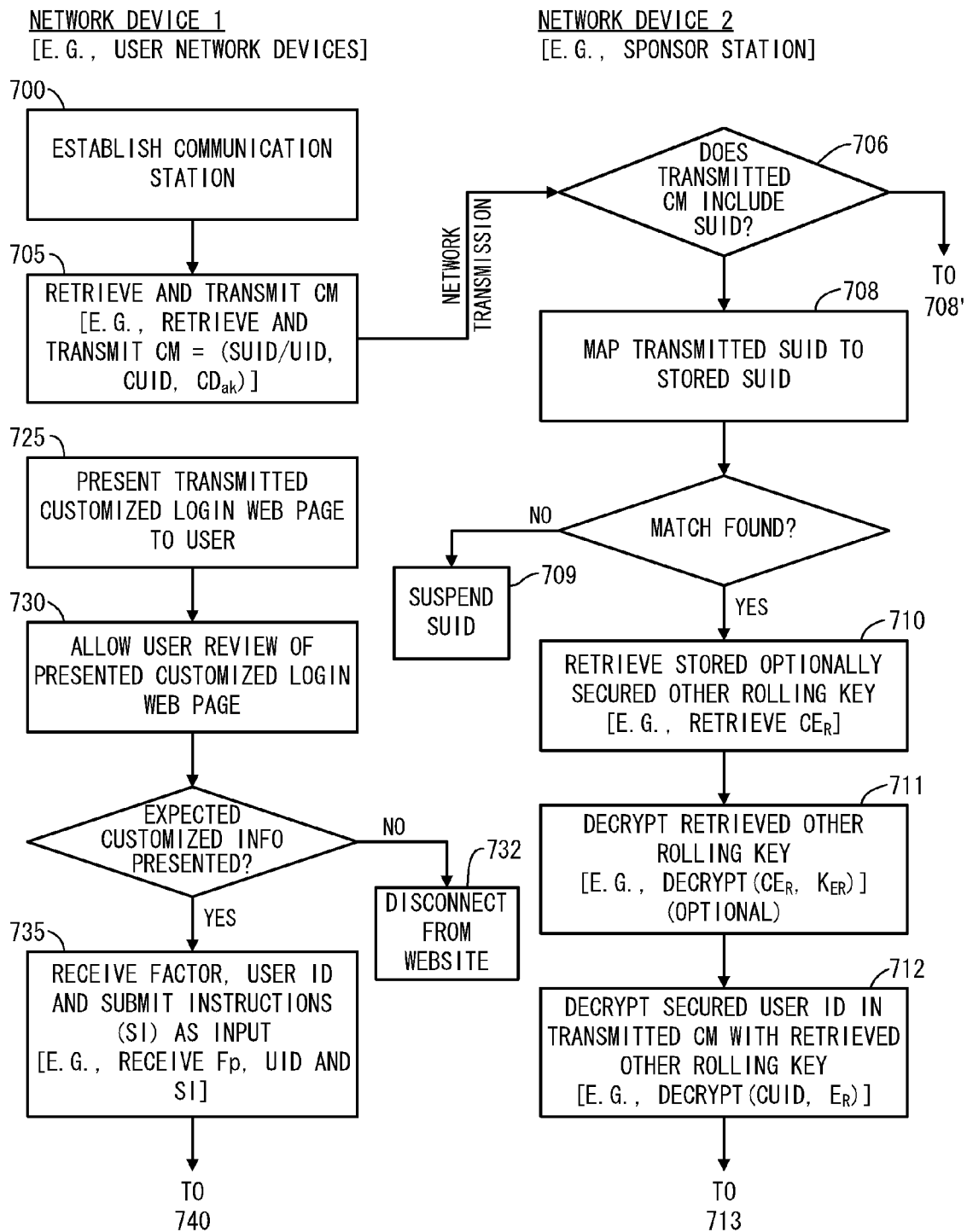
FIGS. 7A-7F depict a flow chart showing certain operations performed during the initial user login protocol, in accordance with the first embodiment of the present invention.
Figure 7B:
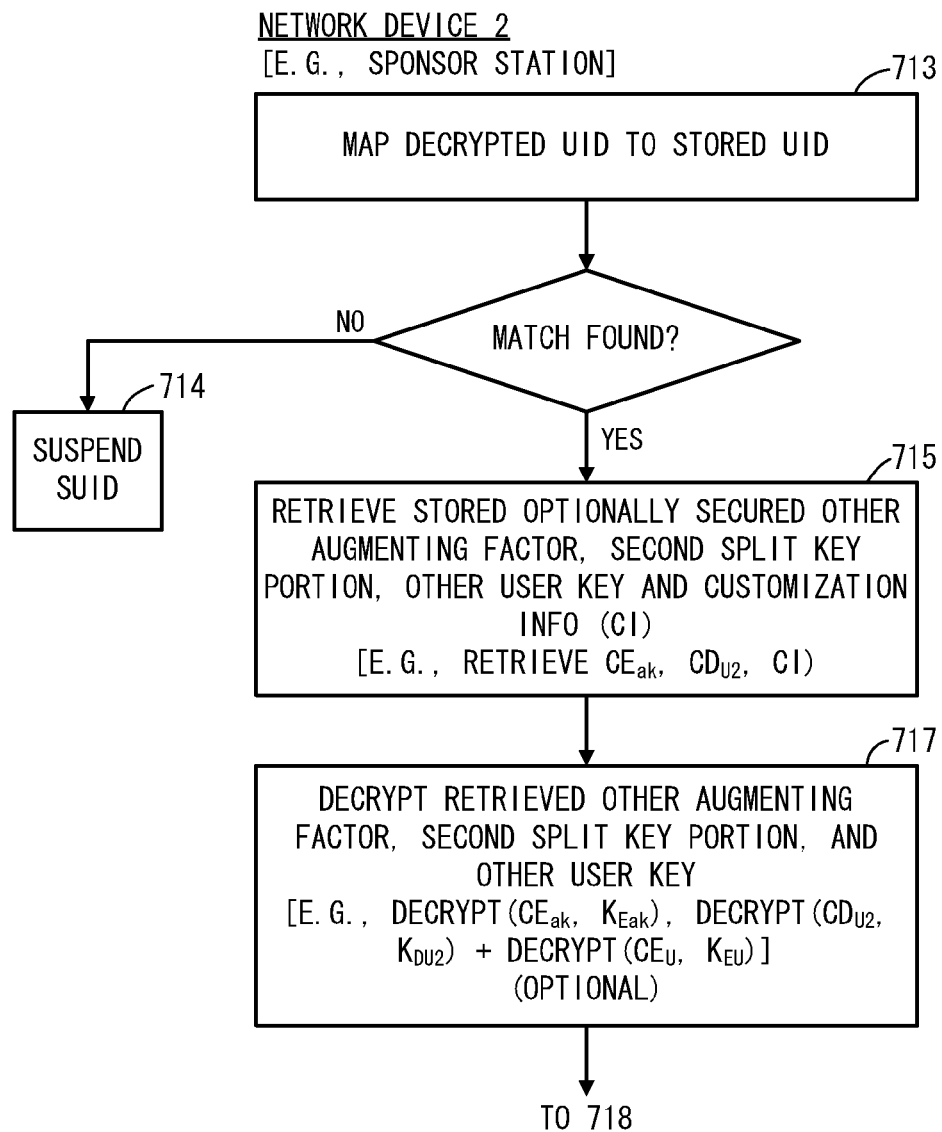
Figure 7C:
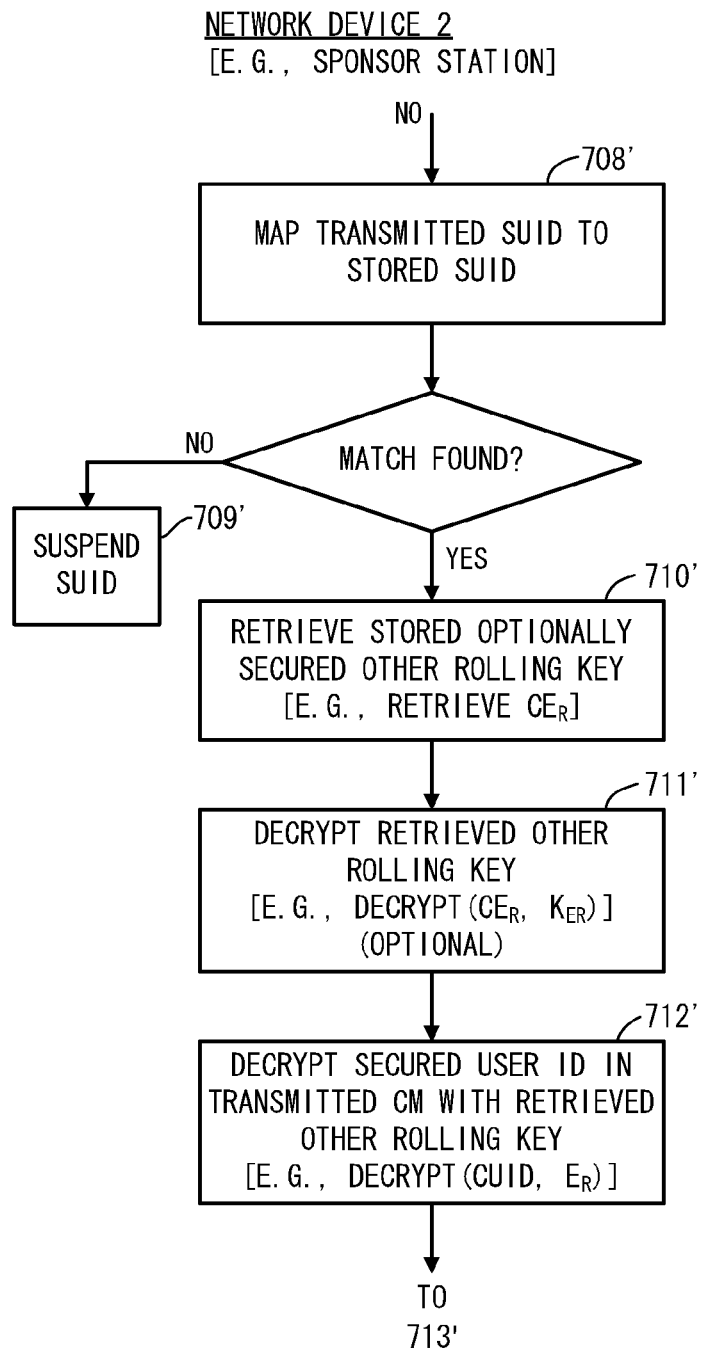
Figure 7D:
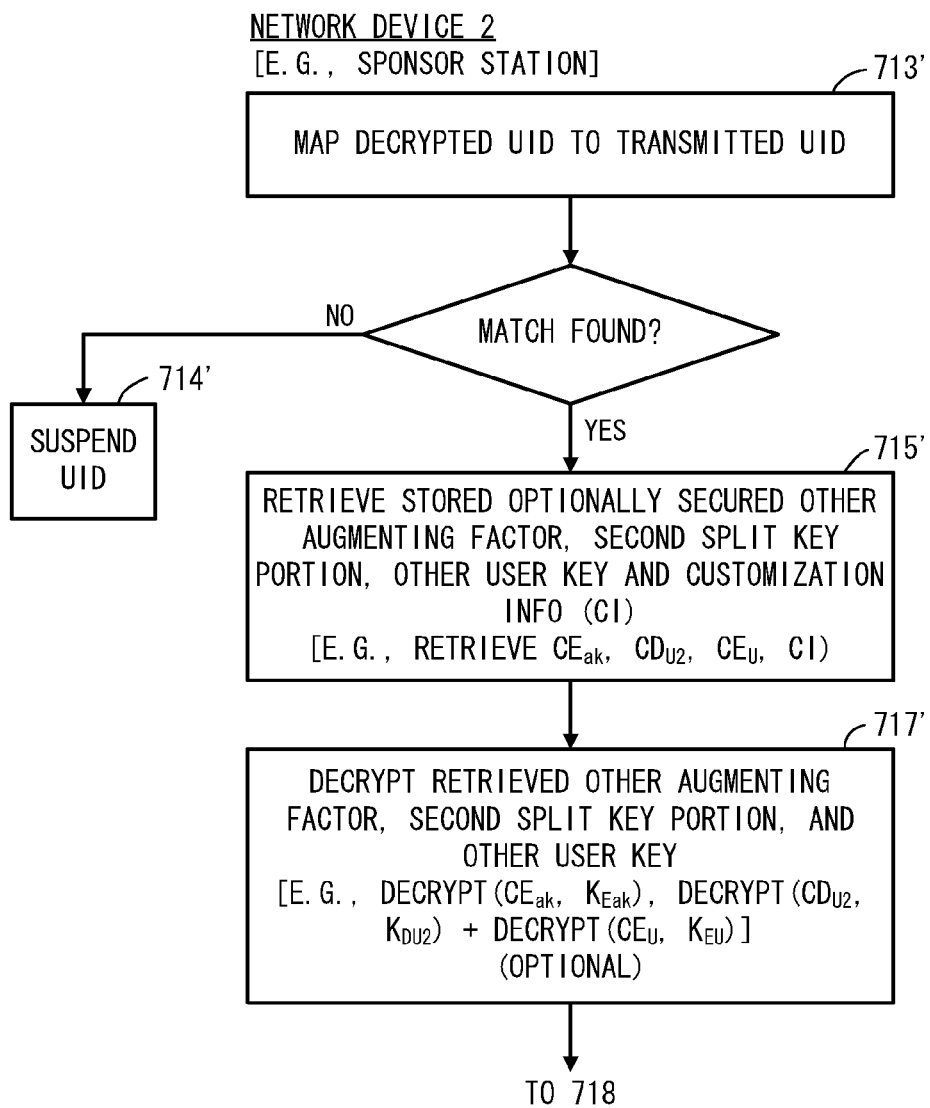
Figure 7E:
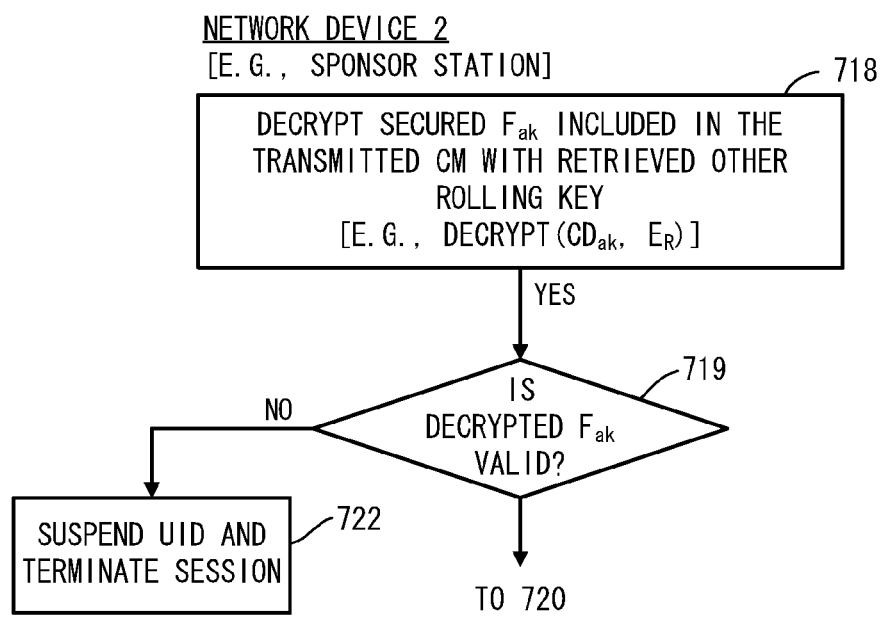
Figure 7F:
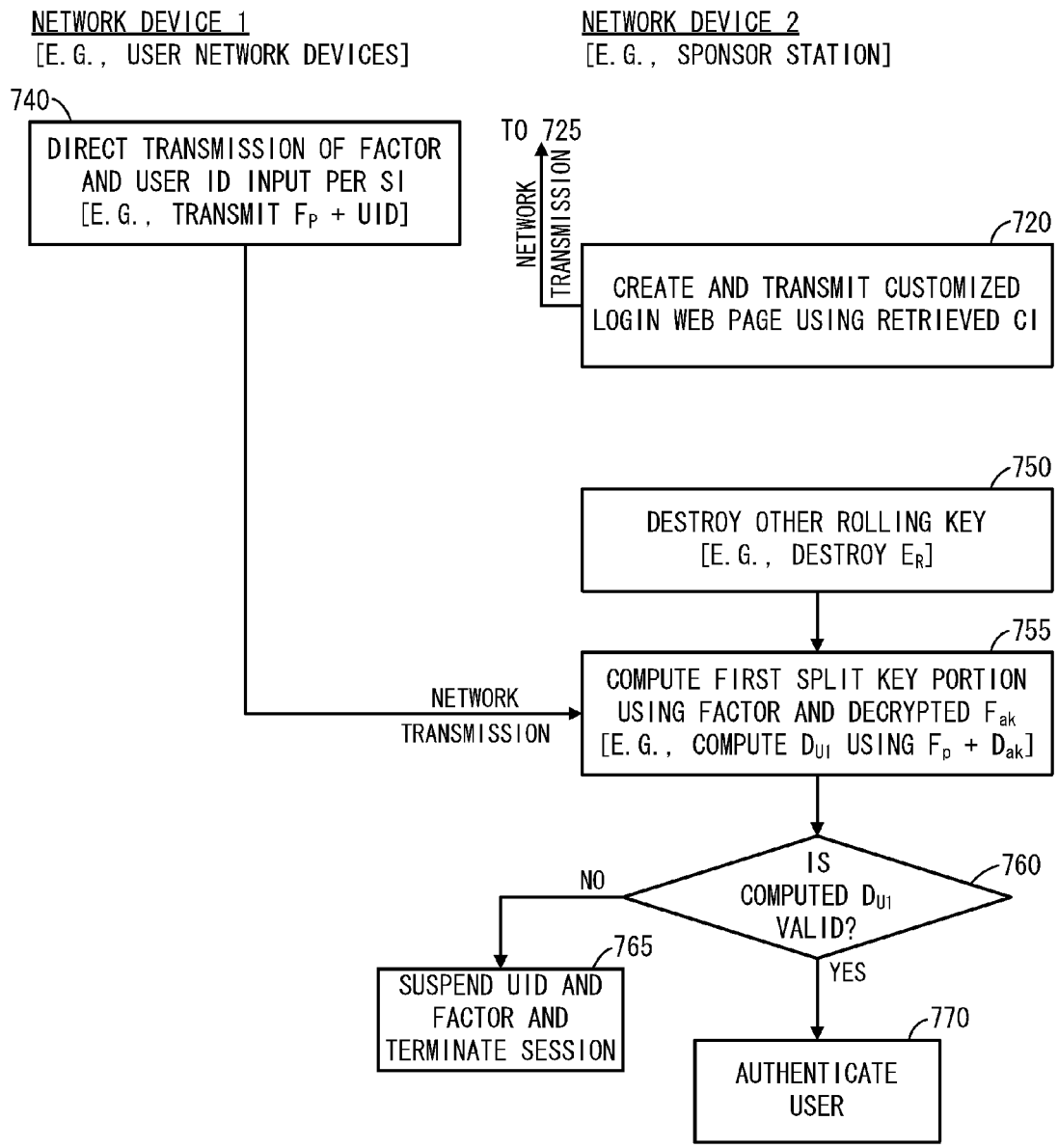

Referring now to FIGS. 6A-6C, in step 600 the processor 300 of the users PC 200, executing programmed instructions stored on the hard disk 325, directs the transmission of the factor $F_p$, which in this case is the user's password input by the user via the keyboard interface 331 and temporarily stored on RAM 323, via the network 10 to the sponsor station 50. In accordance with the processor directive, the modem 360 transmits message, via the I/O port 365. Most typically, the factor $F_p$, which in this implementation is the user's password, will be transmitted by the user device 30 to the sponsor station 50 over a secure communications channel, preferably established by server-side SSL although other means can also be used. It will be understood by those with ordinary skill in the art that there are various alternate means to secure this channel including authentication of the user based on a one-use password or activation code.

The sponsor station 400 receives the message via the I/O port 565. The received message is directed by the modem 560 to the processor 500. After receiving transmitted $F_p$, the processor 500 of the sponsor's server 400, executing programmed instructions stored on the hard disk 525, generates the augmenting factor $F_{ak}$.

More particularly, in step 605 the processor 500 generates a first asymmetric crypto-key pair $D_{ak}$, $E_{ak}$, having a modulus $N_{ak}$. Preferably, the crypto-key pair is an RSA asymmetric crypto-key, although this is not mandatory and another type of crypto-key or even something other than a crypto-key, such as a random number string, could be used if so desired. As the use of the modulus N is well known modulus and not of particular relevance to the present invention, the generated asymmetric crypto-key pair will, at times, be described below only in terms of the private key $D_{ak}$ and public key $E_{ak}$. In this implementation, the augmenting factor $F_{ak}$ is the private key $D_{ak}$, i.e. $F_{ak} = D_{ak}$.

-Generation of the Rolling Key-

As will be described in more detail below, $D_{ak}$ will be stored in a cookie on the hard disk 324 of a user's PC 200. However, it will be recognized that $D_{ak}$ also needs to be protected, since storing any kind of key in the clear should be avoided if possible. Thus, the augmenting factor $D_{ak}$ is beneficially stored on the hard disk 324 of a user's PC 200 in an encrypted state.

Accordingly, at step 610, the processor 500 of the sponsor's server 400 also generates another, or second, asymmetric crypto-key, including a private key $D_R$ and a public key $E_R$, having a modulus $N_R$. Preferably, this generated asymmetric crypto-key is also an RSA asymmetric crypto-key, although this is not mandatory and another type of asymmetric or symmetric crypto-key could also be used. In any event, the asymmetric crypto-key $D_R, E_R$ or symmetric key $K_R$ will serve as a rolling crypto-key and be used to secure the augmenting factor $D_{ak}$. Thus, processor 500 associates this rolling key $D_R, E_R$, modulus $N_R$ or $K_R$ with $D_{ak}, E_{ak}$, modulus $N_{ak}$.

-Securing the Augmenting Factor with the Rolling Key-

In step 615, the processor 500 of the sponsor's server 400 encrypts the augmenting factor $D_{ak}$ and the user ID (UID) with either the private key $D_R$ or public key $E_R$ of the rolling asymmetric crypto-key generated in step 610. In this implementation, private key $D_R$ is used for this encryption, i.e. ciphertext $CD_{ak}$=Encrypt($D_{ak}$, $D_R$) and ciphertext CUID=Encrypt(UID, $D_R$). Alternately the symmetric rolling key $K_R$ is used, i.e., ciphertext $CD_{ak}$=Encrypt($D_{ak}$, $K_R$) and ciphertext CUID=Encrypt(UID, $K_R$).

After the processor 500 of the sponsor's server 400 encrypts the augmenting factor $D_{ak}$ and the user ID with the rolling key $D_R$, in step 616 the processor 500 of the sponsor's server 400 destroys the rolling key $D_R$. Alternately if $K_R$ is used as the rolling key it is not destroyed. In either case, unless an unencrypted copy of the augmenting factor $D_{ak}$ has been maintained by the processor 500, on for example RAM 523, the augmenting factor $D_{ak}$ can now only be used to derive the first private key portion if it is first decrypted using public key $E_R$, i.e. Decrypt($CD_{ak}, E_R$)=$D_{ak}$ or symmetric key $K_R$, i.e., Decrypt($CD_{ak}, K_R$)=$D_{ak}$. Similarly, unless an unencrypted copy of the UID has been maintained by the processor 500, on for example RAM 523, the UID can now only be used if it is first decrypted using public key $E_R$, i.e. Decrypt(CUID, $E_R$)=UID or symmetric key $K_R$, i.e., Decrypt(CUID, $K_R$)=UID. Henceforth the implementation will be described in terms of an asymmetric rolling key $D_R, E_R$ and it will be understood by those with ordinary skill in the art how to alternately use a symmetric rolling key $K_R$.

-Creating and Storing A Special User Identifier-

Optionally, in step 617 the processor 500 of the sponsor's server 400 generates or selects a special user identifier (SUID), which will be known only to the sponsor to be associated with the normal user identifier, i.e. with UID. If so, in step 618, the processor 500 stores UID in association with SUID, for example on the hard disk 525 of sponsor server 400, as will be described in more detail below with reference to FIG. 10A.

-Packaging the Secured Augmenting Factor as a Cookie-

In step 619, the processor 500 of the sponsor's server 400 creates a message in the form of a cookie, which includes the encrypted augmenting factor, i.e. ciphertext $CD_{ak}$, the encrypted user ID, i.e. ciphertext CUID, and either the unencrypted UID, or preferably an unencrypted special user ID (SUID) assigned by the sponsor and not known to the user. The function performed in step 618 is sometimes referred to as packaging the encrypted augmenting factor, the encrypted user ID and the unencrypted special user ID or user ID into a cookie. Techniques for packaging a message in the form of a cookie are well understood by those skilled in the art and accordingly are not further described herein. Thus, the cookie message (CM) preferably includes $CD_{ak}$, CUID and SUID, i.e. CM=($CD_{ak}$, CUID, SUID).

-Securing and Storing the Other Augmenting Factor and Other Rolling Key at the Sponsor- Since, the augmenting factor $F_{ak}$ is the private key $D_{ak}$ of the augmenting asymmetric crypto-key $D_{ak}, E_{ak}$ and the rolling private key $D_R$ of the rolling asymmetric crypto-key $D_R, E_R$ is used to secure the augmenting factor $D_{ak}$, the other parts of the augmenting crypto-key, i.e., $E_{ak}, N_{ak}$, and the other parts of the rolling crypto-key, i.e. $E_R, N_R$, are and stored, preferably securely, at the sponsor server.

At step 620, the processor 500 of the sponsor server 400 preferably secures $E_{ak}, N_{ak}$ and $E_R, N_R$ using the protection capabilities provided by the server's operating system. Most preferably, $E_{ak}, N_{ak}$ and $E_R, N_R$ are securely stored as non-exportable keys in a Windows Operating System key-store. However, if desired, $E_{ak}, N_{ak}$ and $E_R, N_R$ could be securely stored in a Windows Operating System registry, or in the trusted processing module (TPM). There are also other alternatives. For example, $E_R, N_R$ could be encrypted with a crypto-key $K_{ER}$ that has been generated by and stored on the sponsor server 400, e.g. a generated symmetric key, or that is built into the operating system or other software being executed by processor 500 of the sponsor's server 400. $E_{ak}$, $N_{ak}$ could be encrypted with the public key $E_R$, or with a crypto-key $K_{Eak}$ that has been generated by and stored on the sponsor's server 400, e.g. a generated symmetric key, or built into the operating system or other software being executed by processor 500 of the sponsor's server 400. It will be recognized that a key used to encrypt $E_R$ and/or $E_{ak}$ can be asymmetric or symmetric. No matter where or how $E_{ak}, N_{ak}$ and $E_R, N_R$ are stored on the sponsor's computing device, $E_{ak}, N_{ak}$ and $E_R, N_R$ can preferably only be used from the sponsor's computing device at which they are stored.

At step 622, the processor 500 of the sponsor's server 400 stores optionally secured $E_{ak}, N_{ak}$ in association with UID, and $E_R, N_R$ in association with either UID or SUID, as applicable, on the hard disk 525 of the sponsor's server 400. In the later case, this will ensure that the sponsor server must first use SUID to access $E_R$ and then decrypt CUID with $E_R$ to derive UID before separately accessing $E_{ak}$, and customized user information using decrypted UID, as will be further described below.

FIG. 10A depicts a database 1000, implemented on the hard disk 525 of the sponsor's server 400, having, having $CE_R$ stored in association with the SUID of the user, as indicated by column 1010, and having $CE_{ak}$ and customization information (CI) stored in association with the UID of the user, as indicated by column 1015. As will be recognized, associations with the SUID and UID of each other user would be stored in columns 1020-1035. It will also be understood that in practice the database 1000 would typically be greatly extended so as to be capable of storing data associated with many, many users. As will be described further below, data stored in the database 1000 is accessed by the processor 500 of the sponsor's server 400 by mapping known data to the data stored in row 1050 of the database. That is, if the processor receives a cookie with unencrypted SUID, it uses the received SUID to map to row 1050, column 1010, and thereby access $CE_R$, i.e. the stored encrypted rolling key, which in turn can be used to decrypt the CUID and $CD_{ak}$ received in the cookie, which can be used to map to UID in row 1050, column 1015, to access $CE_{ak}$ and CI.

FIG. 10B depicts a database 1000', implemented on the hard disk 525 of the sponsor's server 400, having $CE_R$, $CE_{ak}$ and CI all stored in association with the UID of the user, as indicated by column 1060. As will be recognized, associations with the UID of each other user would be stored in columns 1065-1085. It will also be understood that in practice the database 1000' would typically be greatly extended so as to be capable of storing data associated with many, many users. Like data stored in the database 1000, data stored in the database 1000' is accessed by the processor 500 of the sponsor's server 400 by mapping known data to the data stored in row 1090 of the database. That is, if the processor receives a cookie with a cookie with unencrypted UID, it uses the received UID to map to row 1090, column 1065, and thereby access $CE_R$, i.e. the stored encrypted rolling key, which in turn can be used to decrypt the CUID and $CD_{ak}$ received in the cookie, along with $CE_{ak}$.

-Distribution of the Cookie with the Secured Augmenting Factor-

At step 625, the processor 500 of the sponsor's server 400 directs transmission of the cookie having $CD_{ak}$, CUID, and preferably SUID, which was created in step 618, to the user's network device 30 via network 10. In accordance with the processor directive, the modem 560 transmits message, via the I/O port 565. It should be appreciated that, if the information was in multiple rather than one cookie, e.g. if the encrypted augmenting factor, i.e. ciphertext $CD_{ak}$, and the unencrypted SUID are packaged in one CM and the encrypted user ID, i.e. ciphertext CUID, and the unencrypted SUID are packaged in another cookie, this transmission may be broken into multiple transmissions. Preferably, each transmission of a CM containing $CD_{ak}$ and/or CUID is encrypted with a symmetric key/one time activation code, or other key. The user's PC 200 receives the message via the I/O port 365. The received message is directed by the modem 360 to the processor 300.

At step 630, the processor 300, in turn, directs the storage of the received cookie on the hard disk 325 of the user's networked PC 200. More particularly, the received CM, containing $CD_{ak}$, CUID and preferably SUID, is stored in a persistent state on hard disk 325.

After directing transmission of the CM, at step 635 the processor 500 of the sponsor's server 400 also destroys CUID and if an unencrypted copy of the augmenting factor $D_{ak}$ has been maintained by the processor 500, also $CD_{ak}$. Accordingly, after steps 618 and 635, the processor 500 no longer has access to $D_R$ or CUID. The processor 500 will also no longer has access to $CD_{ak}$, if encrypted $D_{ak}$ is still accessible to the processor.

Additionally, with step 620 and 630 having been completed, the applicable user device 30 has a cookie, containing the $CD_{ak}$, which is the augmenting factor $D_{ak}$ encrypted with the rolling key $D_R$, CUID, which is the user ID encrypted with the rolling key $D_R$, and preferably SUID, which is the unencrypted special user ID known only by the sponsor to be related to UID, which is the normal user ID, persistently stored on the hard disk 325. If a SUID is utilized, the sponsor station 50 has $E_R, N_R$ persistently, and advantageously securely, stored on the hard disk 525 in association with SUID, and has $E_{ak}, N_{ak}$ persistently, and advantageously securely, stored on the hard disk 525 in association with UID, as shown in FIG. 10A. If a SUID is not utilized, the sponsor station 50 has $E_R, N_R$ and has $E_{ak}, N_{ak}$ persistently, and advantageously securely, stored on the hard disk 525 in association with UID, as shown in FIG. 10B.

Key Generation Protocol-initial Generation and Storage of an Augmented Single Factor Split Asymmetric CryPto-Key -Generation of the Augmented Single Factor Split Asymmetric Crypto-Key- At step 640, the processor 500 of the sponsor's server 400 generates yet another, i.e. a third, asymmetric crypto-key pair, including private key $D_U$, public key $E_U$, and modulus $N_U$, which will serve as the user's asymmetric crypto-key.

Next, the processor 500 of the sponsor's server 400 splits $D_U$ into at least a first private key portion $D_{U1}$, which corresponds to the first private key portion sometimes referred to above as D1, and a second private key portion $D_{U2}$, which corresponds to the second private key portion sometimes referred to above as D2, by first determining $D_{U1}$, and then determining $D_{U2}$ utilizing conventional techniques based on the well known relationship between $D_{U1}$ and $D_{U2}$, i.e. $D_{U1}*D_{U2}=D \mod\Phi(N)$.

The processing to determine $D_{U1}$ is based upon the single factor $F_p$ and the augmenting factor $F_{ak}$. In this implementation the single factor $F_p$ is the user's password itself and the augmenting factor $F_{ak}$ is the private key $D_{ak}$, of an augmenting asymmetric crypto-key pair. It is perhaps worthwhile to reiterate that the single factor and/or the augmenting factor could be another type factor. For example, the single factor could alternatively be a hash of the password, such as Sha-1 (password), some other function of the password, or a value that does not correspond to the user's password, so long as using such a factor would not require a footprint on the user's device 30.

The user's password and either $D_{ak}$ or $CD_{ak}$ are, at this point in the process, temporarily, i.e. not persistently, stored at the sponsor station 50, e.g. on the RAM 523, and therefore accessible to processor 500. If only $CD_{ak}$ is accessible, it will be recognized that it can be decrypted by processor 500 using $E_R$ to derive $D_{ak}$.

As is preferable, in this implementation the processor 500 of the sponsor's server 400 calculates $D_{U1}$ utilizing the PKCS-5 algorithm, which is a well known one way function that can be stored on the hard disk 525 or elsewhere at sponsor station 50, at step 645. The equation for $D_{U1}$ is as follows:

$$D_{U1}=PKCS\text{-}5 \text{ (sign } \{F_p, F_{ak}\}, \text{ salt, iteration count)} \quad (1)$$

Thus, in this implementation, $D_{U1}$ is computed in by taking the single factor $F_p$, where $F_p$=password, and transforming this quantity with the augmenting factor $F_{ak}$, where $F_{ak}=D_{ak}$, and then using the result of this transformation as an input to the PKCS-5 algorithm, along with the salt and the iteration count, i.e. $D_{U1}$=PKCS-5 (sign {password, $D_{ak}$}, salt, iteration count). After the determination of $D_{U1}$, the sponsor's server 400 has knowledge of $D_{U1}$, $D_U$ and $N_U$.

Alternatively, the single factor $F_p$ could be expanded as part of the computation of $D_{U1}$ at step 645. For example, the processor 500 of the sponsor's server 400 could calculate Sha-1 (password), sponsor's server 400 calculates $D_{U1}$ utilizing the PKCS-5 algorithm, which is a well known one way function that can be stored on the hard disk 525 or elsewhere at sponsor station 50, at step 645. The equation for $D_{U1}$ is as follows:

$$Du_1=PKCS\text{-}5 \text{ (sign } \{\text{Sha-1 }(F_p), F_{ak}\}, \text{ salt, iteration count)} \quad (2)$$

Thus, in this alternative, $D_{U1}$ is computed by expanding the single factor $F_p$, where $F_p$=password, with a hash function and transforming this quantity with the augmenting factor $F_{ak}$, where $F_{ak}=D_{ak}$, and then using the result of this transformation as an input to the PKCS-5 algorithm, along with the salt and the iteration count, i.e. $D_{U1}$=PKCS-5 (sign {Sha-1 (password), $D_{ak}$}, salt, iteration count).

Notwithstanding how $D_{U1}$ is calculated, in step 650 the processor 500 of the sponsor's server 400 can determine $D_{U2}$ based on the relationship $D_1*D_{U2}=D_U \mod\Phi(N_U)$, and thereby complete the splitting of $D_U$ by computing $D_{U2}$.

After the processor 500 of the sponsor's server 400 determines $D_{U2}$, at step 655 the processor 500 destroys $F_p$, which in this implementation is the user's password, the augmenting factor $F_{ak}$, in whatever form it remains available to the sponsor station 50, i.e. encrypted and/or unencrypted, which in this implementation is $D_{ak}$ and/or $CD_{ak}$, along with $D_U$ and $D_{U1}$.

-Securing and Storing the Augmented Single Factor Split Asymmetric Crypto-key at the Sponsor- Since, one part of the augmented single factor split asymmetric crypto-key, i.e. $D_{U1}$, will be generated each time the user desires to login for a network session, only the other parts of the augmented single factor split asymmetric crypto-key, i.e. $D_{U2}, E_U, N_U$ are stored at the sponsor server.

At step 660, the processor 500 of the sponsor server 400 preferably secures $D_{U2}, E_U, N_U$, using the protection capabilities provided by the server's operating system. Most preferably, $D_{U2}, E_U, N_U$ are securely stored as non-exportable keys in a Windows Operating System key-store. However, if desired, $D_{U2}, E_U, N_U$ could be stored in a Windows Operating System registry, or in the trusted processing module (TPM). There are also other alternatives. For example, $D_{U2}, E_U, N_U$ could be encrypted with the public key $E_R$, or with a crypto-key $K_U$ that has been generated by and stored on the sponsor server 400, e.g. a generated symmetric key, or that is built into the operating system or other software being executed by processor 500 of the sponsor's server 400. For example, $D_{U2}$ could be secured by performing Encrypt ($D_{U2}$, $KD_{U2}$), and $E_U$ could be secured by performing Encrypt ($E_U$, $K_{Eu}$). It will be recognized that a key used to encrypt $D_{U2}, E_U, N_U$ can be asymmetric or symmetric. No matter where or how $D_{U2}$ is stored on the sponsor's computing device, $D_{U2}$ can preferably only be used from the sponsor's computing device at which it is stored.

In step 665, the processor 500 of the sponsor's server 400 stores $D_{U2}, E_U, N_U$ in association with UID, as shown in the databases 1000 and 1000' depicted respectively in FIGS. 10A and 10B, on the hard disk 525 of the sponsor's server 400. Storage in database 1000 ensures that the sponsor server must first use SUID to access $E_R$ and then decrypt CUID with $E_R$ to derive UID, before separately accessing $D_{U2}$ using decrypted UID, as will be described further below. Upon completion of step 665, the processor 500 has persistently stored optionally secured $D_{U2}, E_U, N_U$, on the hard disk 525 of the sponsor station server 400, in association with the UID.

At step 670, the processor 500 of the sponsor's server 400 directs transmission of $E_U, N_U$ to the user's network device 30 via network 10. In accordance with the processor directive, the modem 560 transmits message, via the I/O port 565. Preferably, transmission of $E_U, N_U$ is encrypted with a symmetric key/one time activation code, or other key. The user's PC 200 receives the message via the I/O port 365. The received message is directed by the modem 360 to the processor 300.

At step 675, the processor 300 of the user's PC 200 preferably secures $E_U, N_U$ using the protection capabilities provided by the PC's operating system. $E_U, N_U$ can be securely stored as non-exportable keys in a Windows Operating System key-store. If desired, $E_U, N_U$ could be stored in a Windows Operating System registry, or in the trusted processing module (TPM). There are also other alternatives. For example, $E_U, N_U$ could be encrypted with a crypto-key $K_{UEU}$ that has been generated by and stored on the user's PC 200, e.g. a generated symmetric key, or that is built into the operating system or other software being executed by processor 300 of the user's PC 200. For example, $E_U$ could be secured by performing Encrypt ($E_U$, $K_{UEU}$). It will be recognized that a key used to encrypt $E_U, N_U$ can be asymmetric or symmetric.

In step 680, the processor 300, in turn, directs the storage of the received, optionally secured $E_U, N_U$ on the hard disk 325 of the user's networked PC 200. More particularly, the optionally secured $E_U, N_U$ are stored in a persistent state on hard disk 325.

Login Protocol-With Generation and Distribution of a New Rolling Key To Enhance the Security of the Stored Augmenting Factor -Overview- The entity that has stored the CM on the user device 30, in this implementation a sponsor represented by the sponsor station 50, provides trusted authentication of an individual user during login. For this implementation, the login protocol is described in detail below in the context of a request for authentication being received by the user device 30 from the sponsor station 50. However, those skilled in the art will recognize that the described protocol is easily adapted to requests for authentication received from other than the sponsor station 50.

It should be understood that in the described protocol, the authentication request from the sponsor station 50 may represent an authentication request initiated by an entity other than the sponsor. That is, the authentication request may have been initiated by a merchant represented by a merchant server 40-41 or another user represent by another user device 31-33 or a trusted distinguished entity represented by a distinguished server 60-62. Furthermore, if an entity other than the sponsor station 50, e.g. a merchant represented by a merchant server 40-41 or another user represent by another user device 31-33 or a trusted distinguished entity represented by a distinguished server 60-62, had placed the cookie on the user's device 30, the authentication request could represent an authentication request initiated by a sponsor represented by sponsor station 50. It will also be recognized that a merchant server, such as merchant server 40, or a distinguished server, such as distinguished server 60, might also function as the sponsor server 50, although generally this will not be the case.

-Initial User Authentication and Unlocking the Secured Augmenting Factor-

Referring now to FIG. 7A-7F, at step 700, a communication session is established between the user device 30 and the sponsor station 50 via network 10. Based on the establishment of the communication session between the user device 30 and the sponsor station 50, at step 705 the processor 300 of the user PC 200, executing the browser retrieves the CM stored on hard disk 325 and directs transmission of the CM, i.e. the cookie message, via the network 10. In accordance with the directive, the modem 360 and I/O port 365 of the user PC 200 transmit the CM, via network 10, to the sponsor server 400. The I/O port 565 receives the transmission and the modem 560 directs the CM to the processor 500 of the sponsor's server 400. Thus, the processor 500 of the sponsor's server 400 receives a CM from the user device 30 having $CD_{ak}$, which is the augmenting factor $D_{ak}$ encrypted with the rolling key $D_R$, CUID, which is the UID encrypted with the rolling key $D_R$, and either the UID, which is the unencrypted user ID, or preferably the SUID, which is the unencrypted special user ID known only by the sponsor to be related to UID, which is the normal user ID, i.e. CM=($CD_{ak}$, CUID, SUID/UID).

The processor 500 must attempt to map the unencrypted UID or preferably SUID from the received CM to a stored UID or SUID, as applicable. Optionally, if the sponsor server 400 is capable of creating cookies that include either SUID or UID, in step 706 the processor 500 determines if the received CM includes SUID.

In this regard, if the received CM includes SUID, as is preferable, in step 708 the processor 500 of sponsor station 50 first attempts to map the unencrypted SUID from the received CM to a SUID in row 1050 of database 1000, stored on the hard disk 535 at the sponsor station 50 in association with $E_R$, $N_R$. If no match is found, at step 709 the processor suspends the SUID.

If a match is found, at step 710 the processor 500 retrieves the $E_R$, $N_R$ stored in association with the matched SUID in the database 1000. If $E_R$ is stored in an encrypted state, in step 711 the processor 500 of sponsor station 50 decrypts $E_R$, i.e. $E_R$=Decrypt($CE_R$, $K_{ER}$).

In step 712, the processor 500 applies the retrieved, optionally decrypted $E_R$, and $N_R$ to decrypt the CUID from the received CM, i.e. Decrypt (CUID, $E_R$)=UID. In step 713, the processor 500 then attempts to map the decrypted UID to a UID in row 1050 of database 1000. If no match is found, at step 714 the processor suspends the UID.

If a match is found, at step 715 the processor retrieves the public augmenting key $E_{ak}$, the Cl, and the second private key portion $D_{U2}$ and public key $E_U$ that have been previously stored in association with the matched UID in the database 1000. If $E_{ak}$, $D_{U2}$ and/or $E_U$ is stored in an encrypted state, in step 717 the processor 500 of sponsor station 50 decrypts $E_{ak}$, i.e. $E_{ak}$=Decrypt($CE_{ak}$, $K_{Eak}$), $D_{U2}$, i.e. $D_{U2}$=Decrypt($CD_{U2}$, $K_U$), and/or $E_U$, i.e. $E_U$=Decrypt($CE_U$, $K_U$).

Preferably, the Cl includes a name identifier for the user, such as Alice Smith. If the matches have been found, the user has demonstrated knowledge of the SUID, UID, and the unexpired rolling key $D_R$.

Alternatively, if the received CM is determined to include unencrypted UID, in step 708' the processor 500 of sponsor station 50 attempts to map the unencrypted UID from the received CM to a UID stored in row 1090 of database 1000', on hard disk 535 at the sponsor station 50. If no match is found, at step 709' the processor suspends the UID. If a match is found, in step 710' the processor 500 retrieves the $E_R$, $N_R$ stored in associated with the matched UID in the database 1000'. If $E_R$ is stored in an encrypted state, in step 711' the processor 500 of sponsor station 50 decrypts $E_R$, i.e. $E_R$=Decrypt($CE_R$, $K_{ER}$).

In step 712', the processor 500 applies the retrieved, optionally decrypted $E_R$ and $N_R$ to decrypt the CUID from the received CM, i.e. Decrypt (CUID, $E_R$)=UID. In step 713', the processor 500 then attempts to map the decrypted UID to the unencrypted UID from the received CM. If no match is found, at step 713' the processor suspends both the decrypted UID and the unencrypted UID from the CM. If a match is found, in step 715' the processor 500 retrieves $E_{ak}$, the Cl, and the second private key portion $D_{U2}$ and public key $E_U$ that have been previously stored in association with the matched UID in the database 1000'. If $E_{ak}$, $D_{U2}$ and/or $E_U$ is stored in an encrypted state, in step 717' the processor 500 of sponsor station 50 decrypts $E_{ak}$, i.e. $E_{ak}$=Decrypt($CE_{ak}$, $K_{Eak}$), $D_{U2}$, i.e. $D_{U2}$=Decrypt($CD_{U2}$, $K_U$), and/or $E_{U2}$, i.e. $E_{U2}$=Decrypt ($CE_{U2}$, $K_U$). If the matches have been found, the user has demonstrated knowledge of the UID and the un-expired rolling key $D_R$.

If all the required matches in steps 708-717 or 708'-717' have been found, at step 718, the processor 500 of sponsor server 400 decrypts the received $CF_{ak}$, which is the augmenting factor $F_{ak}$ encrypted with the rolling key, in this implementation $CD_{ak}$=Encrypt ($D_{ak}$,$D_R$). Accordingly, at step 718 the processor 500 performs Decrypt ($CD_{ak}$,$E_R$)=$D_{ak}$.

At step 719, the processor 500 of sponsor server 400 determines whether or not the decrypted augmenting factor $F_{ak}$, in this implementation $D_{ak}$ computed from the information transmitted by the user device 30 in the CM is in fact the augmenting factor included in the CM which the sponsor station 50 had planted on the user's device 30. This can be done using any of several well known techniques. For example, the processor 500 could encrypt a test message TM using the retrieved, optionally decrypted, other augmenting key $E_{ak}$, i.e. ciphertext CTM=Encrypt(TM, $E_{ak}$), and then attempt to decrypt CTM using the decrypted augmenting factor $D_{ak}$, i.e. Decrypt(CTM, $D_{ak}$)=TM.

If TM is successfully recovered, the user device 30 has explicitly proved knowledge of $D_{ak}$, which in this implementation serves as the augmenting factor $F_{ak}$, and has implicitly demonstrated knowledge of the user portion of the applicable key of the private-public asymmetric crypto-key pair associated with the user, which in this implementation is $D_{U1}$, to the sponsor station 50. In such a case, the login process proceeds to step 720. If not, at step 722 the processor 500 preferably suspends the user's ID and terminates the session.

Having initially verified the user's knowledge of the augmenting factor, at step 720 the processor 500 creates and directs transmission of a customized login web page, corresponding to the retrieved Cl, to the user's device 30. For example, the transmitted customized login web page may say "Welcome Alice Smith, please enter your user ID and password below and click-on the submit button". In accordance with the directive, the modem 560 and I/O port 565 of the sponsor server 400 function to transmit the customized login web page, via network 10, to the user's device 30.

It should be understood that the customized login web page itself is not encrypted by the server station 50 and therefore can be considered to be transmitted in the clear. However, preferably the communication of the customized login web page is via a secure channel. The I/O port 365 receives the transmission and the modem 360 directs the customized login web page to the processor 300 of the user's PC 200.

At step 725 the processor 300 of the user's PC 200 directs the presentation of the customized login web page to the user via the display controller 320 and display interface 321.

-Steps 700-725 Provide True Protection Against Impostor Website Attacks-

It will be understood that the browser will only retrieve and direct transmission of the CM if a communication session is established with the station that had originally planted the CM at the user device 30. Thus, the browser executing on the processor 300 of the user device 30 will only retrieve and direct transmission of the CM at step 705 if a communication session has been established with the sponsor station 50 at step 700.

An imposter website, by definition, is at a station other than the station that had originally transmitted the CM. Thus, communications with the imposter station require establishment of a communication session with a station other the sponsor station 50. Accordingly, the browser executing on the processor 300 of the user device 30 will not retrieve and direct transmission of the CM at step 705 to an imposter station, and therefore an imposter should not be able to obtain the CM from the user device 30. This in turn means that the imposter will not be capable of initially authenticating to the sponsor because it will be unable to demonstrate knowledge of the SUID and UID, if an SUID is utilized, or of the rolling key $D_R$. Even if an SUID is not utilized and an imposter gains knowledge of the UID, the imposter would still be unable to initially authenticate to the sponsor, because the imposter will not have access to the CM, and therefore will have no knowledge of the rolling key $D_R$.

On the other hand, an attacker that has access to the user's network device 30 or that launches a successful MITM attack from another network device, could gain access to the CM, and thus to $CD_R$, CUID and SUID/UID. If so, the MITM attacker will be able to demonstrate knowledge of the SUID and/or UID, as applicable, and the rolling key $D_R$. by passing the CM on to the sponsor station 50, and thereby initially authenticate itself to the sponsor station 50 as the user.

-Initial Sponsor Authentication and Submission of the User ID and Password-

At step 730, the user first reviews the presented customized login web page to confirm that expected customized information, e.g. "Welcome Alice Smith, please enter your user ID and password below and click-on the submit button", appears. If the expected customized information is not presented, e.g. if the presented customized information that appears says "Welcome Peter Jones, please enter your user ID and password below and click-on the submit button", at step 732 the user should immediately disconnect from the website, as this would indicate that the site may be an imposter website. Accordingly, the user is given the means to detect an imposter website before providing the user password and, if a SUID is utilized, the unencrypted UID to an imposter website. On the other hand, if the presented customized login web page presents the expected customized information, this evidences, although it does not necessarily prove, that the website with which the user device 30 is communicating has knowledge of the rolling key $E_R$ and, in the case of the CM including the SUID, of the association of SUID with UID.

In any event, based on the presented customized login web page having the expected customized information or the user failing to detect that the presented customized login web page lacks expected customized information, at step 735 the user enters his/her UID, password combination and a submit instruction (SI), e.g. clicks on the submit button on the presented customized login web page. It should be understood that, if the user has previously requested that the UID be stored by the user's PC 200, the UID may be input to the processor from storage rather than by the user entering the UID to the presented login web page via the keyboard or some other input device. Based on the receipt of the submit instruction, in step 740 the processor 300 of the user PC 200 directs transmission of the entered UID and $F_p$, which in this implementation is the entered user password itself, to the sponsor's server 50.

In accordance with the directive of the processor 300, the modem 360 and I/O port 365 of the user's PC 200 function to transmit the entered UID and $F_p$, i.e. the entered password in the present implementation, via network 10, to the sponsor station 50. Preferably, this communication from the user device 30 to the sponsor server 50 is sent via a secure channel, such as a channel protected by server side SSL, which is well understood by those skilled in the art and therefore not further described here. The I/O port 565 receives the transmission and the modem 560 directs the received UID and $F_p$, i.e. the entered password, to the processor 500 of the sponsor's server 400.

It should be recognized that in implementations in which $F_p$ is a function of the user's password, the processor 300 of the user device 30 may first generate $F_p$ from the entered user's password before transmitting $F_p$ in response to the submit instruction. In such implementations, in which case the password itself is never transmitted as part of step 740.

-Deriving the User's Portion of the Split Private Key-

In order to complete authentication of the user to the sponsor station 50, the user, represented by the user device 30, must demonstrate knowledge of the single factor $F_p$, which in this implementation is the user's password itself, and the augmenting factor $F_{ak}$, which in this implementation is the private key $D_{ak}$. It should be understood that demonstrating knowledge of the single factor $F_p$ and the augmenting factor $F_{ak}$ implicitly demonstrates knowledge of $D_{U1}$. While the user device 30 may, as in this implementation, provide the user's password to the sponsor station 50, it preferably does so only after the sponsor station has presented the expected customized information to the user that evidences the sponsor's knowledge of the pubic rolling key $E_R$, and, if applicable, a relationship between SUID and UID.

It is perhaps also worthwhile highlighting here that, as has been described above, at this point, if an SUID was included in the CM received by the sponsor station 50 from the user device 30, it has been matched to the associated UID, and the CUID included in the CM has been deciphered by applying the sponsor's rolling key $E_R$ to decrypt CUID. However, the user's encrypted augmenting factor $CD_{ak}$, which was also included in the CM, may not have been deciphered at this point.

If not, at step 745, the processor 500 of sponsor station 50 again applies the sponsor's rolling key $E_R$ to decrypt $CD_{ak}$ and thereby obtain $D_{ak}$ i.e. $D_{ak}$=Decrypt($CD_{ak}$, $E_R$). It should be understood that this step could be performed before or after receiving the user's password.

At step 750, which is preferably performed at a point promptly following the decryption of both CUID and $CD_{ak}$, the processor 500 destroys $E_R$, $N_R$ or alternatively sets a flag or other indicator that $E_R$, $N_R$ must be reset, or both.

At step 755 the processor 500 of sponsor's station 50 computes $D_{U1}$, by transforming the received $F_p$, i.e. the user password itself in this implementation, with recovered augmenting factor $D_{ak}$, and then using the result of this transformation as an input to the PKCS-5 algorithm, along with the salt and the iteration count. The equation for $D_{U1}$, is as follows:

$$D_{U1} = PKCS\text{-}5 \text{ (sign \{password, } D_{ak}\}, \text{ salt, iteration count)} \quad (3)$$

-Final User Authentication and Completing the User Login Requirements-

At step 760, the processor 500 of sponsor station 50 determines whether or not the $D_{U1}$, computed from the information transmitted by the user device 30 is in fact the first private key portion that has been used to derive the second private key portion $D_{U2}$. This can be done using any of several well known techniques. For example, the processor 500 could encrypt a test message TM using the retrieved, optionally decrypted, user public key $E_U$, i.e. ciphertext CTM=Encrypt (TM, $E_U$), and then attempt to decrypt CTM using the computed first private key portion $D_{U1}$, and the retrieved, optionally decrypted, second private key portion $D_{U2}$, i.e. Decrypt (CTM, $D_{U1}$*$D_{U2}$)=TM.

If TM is successfully recovered, the user device 30 has proved knowledge of the user password itself, which in this implementation serves as the single factor $F_p$, and of $D_{ak}$, which in this implementation serves as the augmenting factor $F_{ak}$, and has implicitly demonstrated knowledge of the user portion of the applicable key of the private-public asymmetric crypto-key pair associated with the user, which in this implementation is $D_{U1}$, to the sponsor station 50. In such a case, at step 770 the sponsor station 50 fully authenticates the user, the user login is successfully completed, and the session is allowed to continue. If not, the sponsor station 50 is unable to fully authenticate the user, and the user login is unsuccessful. In such a case, at step 765 the processor 500 preferably suspends the user's ID and password, and terminates the session. It will be recognized that, if desired, the user's knowledge of additional augmenting factors could be explicitly verified by the sponsor station 50 in a manner similar to that described above, although this is not mandatory.

-Steps 745-770 Provide Enhanced Protection Against MITM Attacks-

As described above, in order to complete authentication, the user most also demonstrate knowledge of the single factor $F_p$, which in this implementation is the user's password but could be a function of the user's password, and the augmenting factor $F_{ak}$, which in this implementation is the private key $D_{ak}$, since both $F_p$ and $F_{ak}$ are required to compute the first key portion $D_{U1}$ of the private key $D_U$ of the user's asymmetric crypto-key pair $D_U$ and $E_U$.

Thus, an attacker that obtains the CM by gaining physical access to the user's network device 30 or by launching a man-in-the-middle attack from another network station or device, but does not have access to the user's password, will be unable to demonstrate the necessary knowledge, and will therefore be incapable of fully authenticating to the sponsor station 50 to complete the user login.

The likelihood an attacker that gains physical access to the user's network device 30 will also have access to the user's password is small so long as the user's password is not be persistently stored on the user's network device or disclosed by the user to any other person.

However, an attacker that launches a successful MITM attack from another network station or device could gain access to the user's password or a function of the user's password which serves as the single factor $F_p$. If so, the MITM attacker will be able to demonstrate knowledge of the single factor $F_p$ by passing the single factor $F_p$ on to the sponsor station 50, and thereby fully authenticate itself to the sponsor station 50 as the user to successfully complete the user login requirements. Thus, there remains a substantial risk of a phisher obtaining all credentials necessary to log-in as the user via a successfully launch MITM attack.

-Resetting the Rolling Key-

While the risk of a phisher obtaining all credentials necessary to log-in as the user via a MITM attack cannot be eliminated by augmented single factor split key cryptography, the potential harm which may result can be reduced by the resetting of the rolling key, as will be further described below.

If the public rolling key, i.e. $E_R$, and the modulus, i.e. $N_R$, have not been previously destroyed, after final user authentication and completion of the user login requirements, the processor 500 destroys the public rolling key, i.e. $E_R$, and the modulus, i.e. $N_R$, so that they are no longer available or stored on the hard disk 525.

Figure 8A:
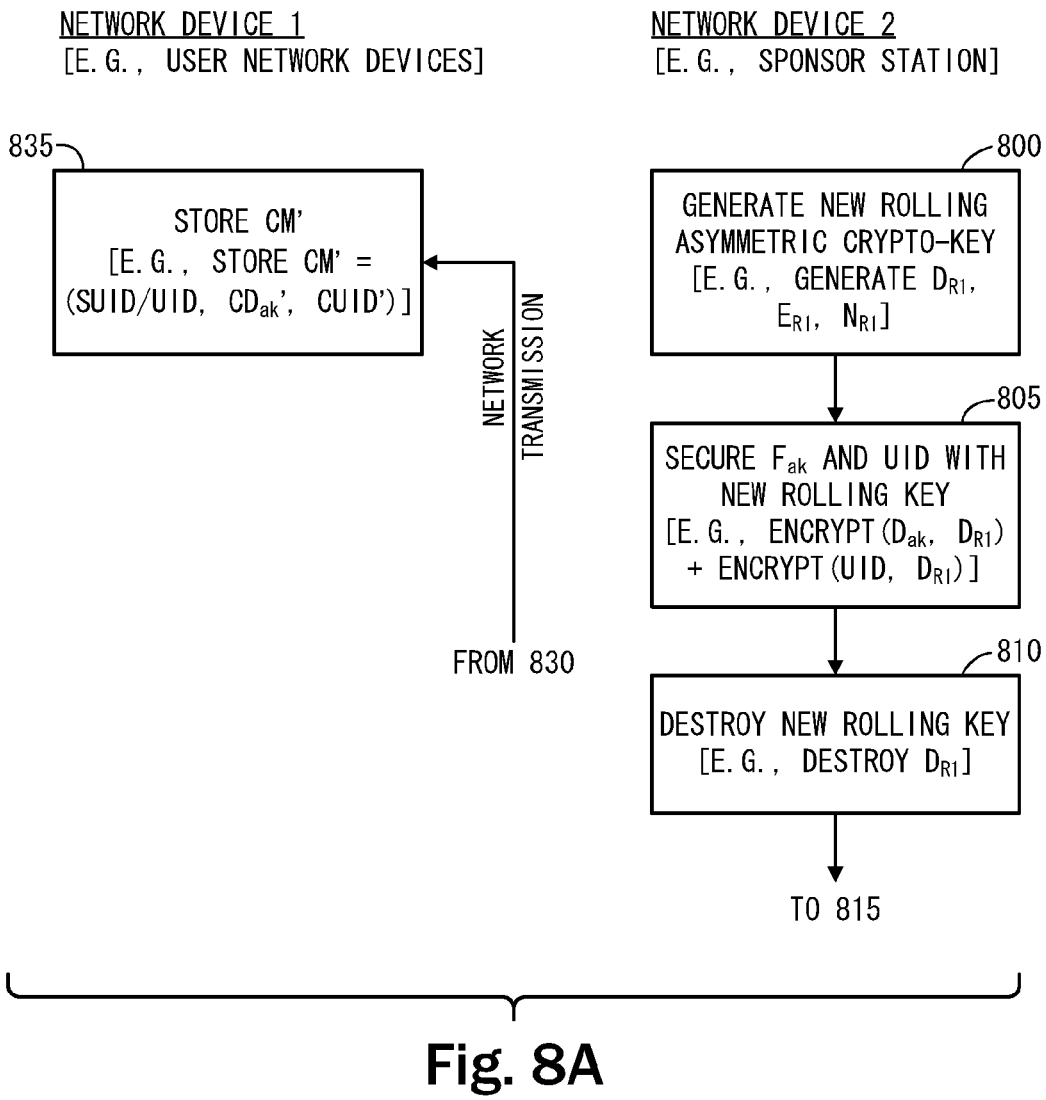
FIGS. 8A and 8B depict a flow chart showing other operations performed during the user login protocol to generate and distribute a new rolling key to enhance the security of a stored augmenting factor, in accordance with the first embodiment of the present invention.
Figure 8B:
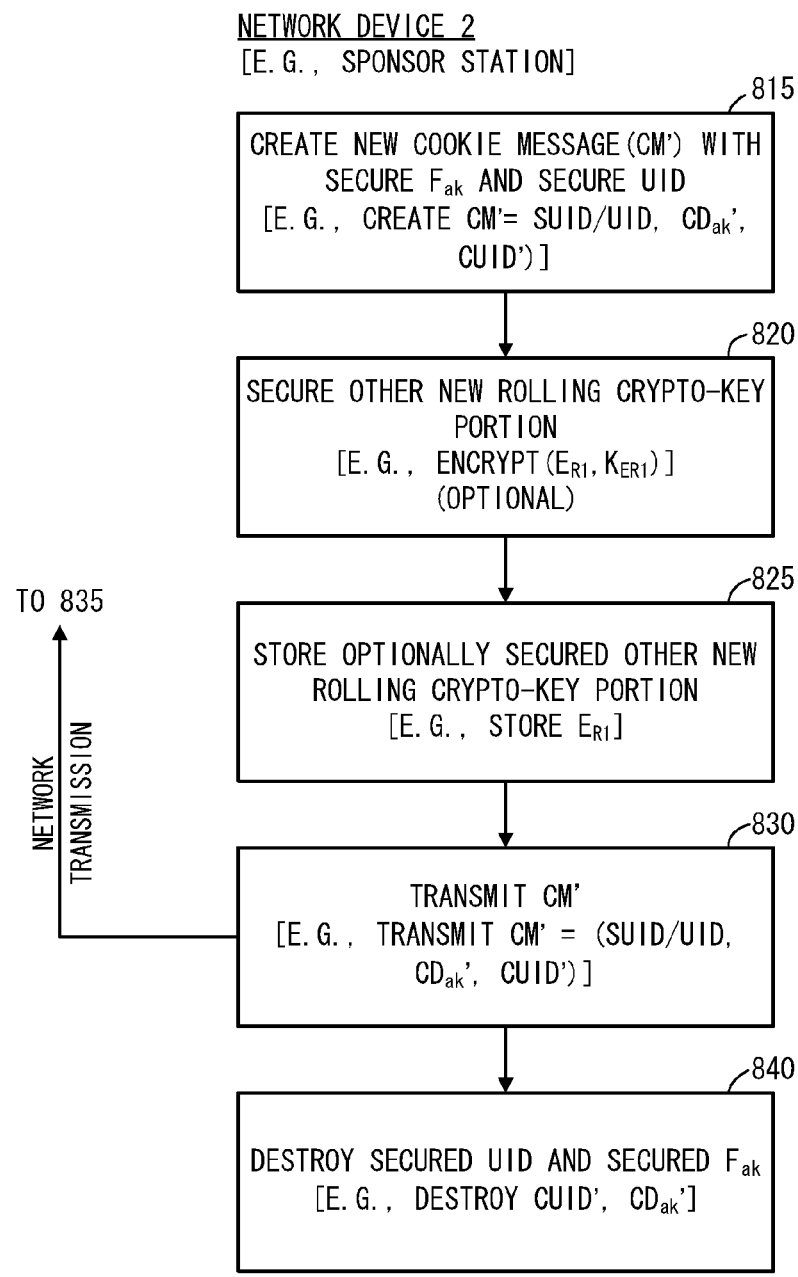

FIGS. 8A and 8B depict the process performed by the sponsor station 50 to reset the rolling asymmetric crypto-key. In step 800, processor 500 generates a new rolling asymmetric crypto-key pair in the same manner as the originally generated rolling asymmetric crypto-key. This new rolling crypto-key has a different private key, which will be referred to as $D_{R1}$, a different public key, which will be referred to as $E_{R1}$, and a different modulus $N_{R1}$.

In step 805, the processor 500 of the sponsor's server 400 encrypts the augmenting factor $D_{ak}$ and the user ID (UID) with either the private key $D_{R1}$ or public key $E_{R1}$ of the reset rolling asymmetric crypto-key generated in step 800. In this implementation, private key $D_{R1}$ is used for this encryption, i.e. ciphertext $CD_{ak}'=Encrypt(D_{ak}, D_{R1})$ and ciphertext $CUID'=Encrypt(UID, D_{R1})$.

After the augmenting factor $D_{ak}$ and the user ID are encrypted with the reset rolling key $D_{R1}$, in step 810 the processor 500 of the sponsor's server 400 destroys the rolling key $D_{R1}$.

In step 815, the processor 500 of the sponsor's server 400 creates a new message in the form of a cookie, which includes the encrypted augmenting factor $F_{ak}$, i.e. in this implementation ciphertext $CD_{ak}'$, the encrypted user ID, i.e. ciphertext CUID', and either the unencrypted UID, or preferably the unencrypted special user ID, i.e. SUID. Thus, the new cookie message (CM') preferably includes $CD_{ak}'$, CUID' and SUID, i.e. CM'=($CD_{ak}'$, CUID', SUID).

Since the rolling private key $D_{R1}$ of the rolling asymmetric crypto-key $D_{R1}, E_{R1}$ is used to secure the augmenting factor $D_{ak}$, the other parts of the rolling crypto-key, i.e. the other rolling key $E_{R1}$, and the modulus $N_{R1}$, are stored at the sponsor server.

At step 820, the processor 500 of the sponsor server 400 secures $E_{R1}, N_{R1}$ preferably using the protection capabilities provided by the server's operating system, although there are other alternatives as discussed above, such as encrypting $E_{R1}$, $N_{R1}$ with a crypto-key $K_{ER1}$ that has been generated by and stored on the sponsor server 400, e.g. a generated symmetric key, or that is built into the operating system or other software being executed by processor 500 of the sponsor's server 400. It will be recognized that a key used to encrypt $E_{R1}$ can be asymmetric or symmetric, but the rolling key $E_{R1}$ must be part of an asymmetric crypto-key.

At step 825, the processor 500 of the sponsor's server 400 stores the optionally secured $E_{R1}, N_{R1}$ in association with either UID or SUID, as applicable, on the hard disk 525 of the sponsor's server 400. In the later case, this will ensure that the sponsor server must first use SUID to access $E_{R1}$, and then decrypt CUID' with $E_{R1}$ to derive UID before separately accessing $E_{ak}$, and customization information Cl using decrypted UID, as described above. Optionally secured $E_{R1}$, $N_{R1}$ are preferably stored in database 1000 or 1000', as applicable, at the same location as that at which optionally secured $E_R, N_R$ had previously been stored in database 1000 or 1000'.

At step 830, the processor 500 of the sponsor's server 400 directs transmission of the new CM' having $CD_{ak}'$, CUID', and preferably SUID, which was created in step 815, to the user's network device 30 via network 10. In accordance with the processor directive, the modem 560 transmits message, via the I/O port 565. Preferably, the transmission of a CM' containing $CD_{ak}'$ and/or CUID' is encrypted with a symmetric key/one time activation code, or other key. The user's PC 200 receives the message via the I/O port 365. The received message is directed by the modem 360 to the processor 300.

At step 835, the processor 300, in turn, directs the storage of the received CM' on the hard disk 325 of the user's networked PC 200. More particularly, the received CM', containing $CD_{ak}'$, CUID' and preferably SUID, is stored in a persistent state on hard disk 325.

After directing transmission of the CM', at step 840 the processor 500 of the sponsor's server 400 also destroys CUID' and $CD_{ak}'$. Accordingly, after steps 815 and 840, the processor 500 no longer has access to $D_{R1}$, CUID', or $CD_{ak}'$.

Additionally, with step 820 and 830 having been completed, the applicable user device 30 has a new CM', containing the $CD_{ak}'$, which is the augmenting factor $D_{ak}$ encrypted with the rolling key $D_{R1}$, CUID', which is the user ID encrypted with the rolling key $D_{R1}$, and preferably SUID, which is the unencrypted special user ID known only by the sponsor to be related to UID, which is the normal user ID, persistently stored on the hard disk 325. The sponsor station 50 has $E_{R1}, N_{R1}$ persistently, and advantageously securely, stored on the hard disk 525 in association with SUID, and has $E_{ak}, N_{ak}$ persistently, and advantageously securely, stored on the hard disk 525 in association with UID.

-Steps 800-840 Provide Further Enhanced Protection Against MITM Attacks-

The use of a rolling key to secure an augmenting factor needed to generate a private key portion of a user's split asymmetric crypto-key decreases the ability of a phisher using a MITM attack to spoof the system. Even in the unlikely event that an attacker obtains access to SUID, $CD_{ak}$, CUID, UID, and the user's password, the rolling key $D_R$, will become outdated the next time the user performs a login, whether it is successful, which will be the case if the user's login is performed prior to the attacker attempting to use the information to login as the user, or unsuccessful, which will be the case if the user's login is performed after the attacker has used the information to login as the user. This is because, in either case, the rolling key obtained by the attacker and that maintained by the user will be out of synchronization.

Furthermore, if the user's login is performed prior to the attacker attempting to login using the information, the rolling key that the attacker has access to will be out of synchronization with the corresponding key maintained by the authenticating network device, e.g. the sponsor station 50. On the other hand, if the user's login is performed after the attacker has logged-in using the information, the rolling key that the user has access to will be out of synchronization with the corresponding key maintained by the authenticating network device, e.g. the sponsor station 50. Thus, the next attempted login, in the former case by the attacker and in the later case by the user, will result in an immediate suspension of the user's ID and thus the user's account.

Accordingly, even if the attacker were to overcome other obstacles described above, the roaming of the rolling keys make it highly likely that the attacker would, at best, be able to spoof the system only one time before the rolling key, which the attacker has obtained, becomes useless or the legitimate user becomes aware of the attack because the rolling keys are no longer in sync. Thus, an attack using the user device 30 should quickly become apparent to the legitimate user and/or authenticating entity, resulting in prompt suspension of the user's ID and account after an attack.

Because of the change in the rolling key, an attacker that has knowledge of the user's password and obtains the originally stored CM by gaining physical access to the user's network device 30 or by launching a man-in-the-middle attack from another network station or device, will only be able to demonstrate the necessary knowledge, e.g. knowledge of the current rolling key and the augmenting factor $D_{ak}$ and UID encrypted with the current rolling key, and will therefore only be capable of fully authenticating to the sponsor station 50 and completing the user login during a single session.

However, it should be understood that while the use of the rolling key does provide some level of additional protection, if the attacker is able to launch an ongoing MITM attack, the attacker is likely to be able to demonstrate the necessary knowledge even after that rolling key has been changed, and thus be able to fully authenticate itself to the sponsor station 50 as the user and successfully complete the user login requirements during later communications sessions.

-Final Sponsor Authentication and Completing Login-

Figure 9:
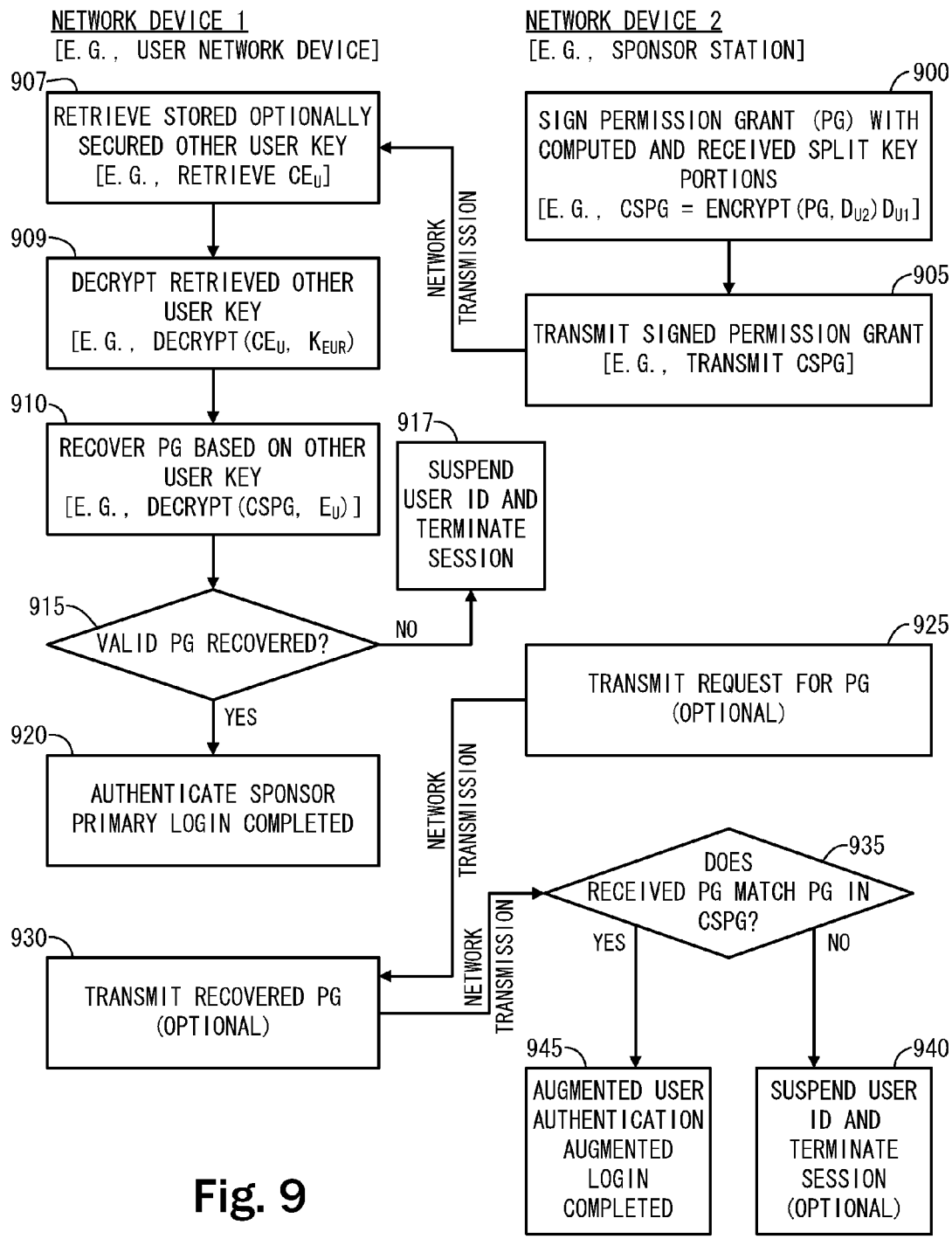
FIG. 9 depicts a flow chart showing operations performed during the final user login protocol, in accordance with the first embodiment of the present invention.

Referring now to FIG. 9, because in this implementation the server station 50 generates the first private key portion $D_{U1}$, at step 900 the processor 500 of sponsor server 400 creates a signed permission grant (SPG) using both $D_{U1}$, and $D_{U2}$. Note that neither the rolling keys $D_R$ and $E_R$, nor the password related factor $F_p$, which in this implementation is the password itself, nor the augmenting factor keys $D_{ak}$ and $E_{ak}$ are applied. The signed permission grant has the following form:

$$\text{CSPG=Encrypt (sign }(PG)\, D_{U2})\, D_{U1} \quad (4)$$

Thus, in this implementation, a permission grant PG is signed with $D_{U2}$, and then encrypted with $D_{U1}$ to complete the signature by the sponsor station 50. At step 905, the processor 500 of sponsor server 400 directs and, in accordance with this directive the modem 560 and I/O port 565 function to transmit the CSPG to the user device 30 via network 10. The I/O port 365 receives the transmitted CSPG and modem 360 directs the received CSPG, to processor 300 of the user PC 200.

At step 907 the processor 300 retrieves $E_U$ and $N_U$, if appropriate from storage. As discussed above, $E_U$ and $N_U$, may for example be stored on hard disk 325. If $E_U$ and/or $N_U$ are stored in a secured state, in step 909 the processor 300 of user PC 200 decrypts $E_U$, e.g. $E_U$=Decrypt($CE_U$, $K_{EUR}$).

At step 910, the processor 300 of user PC 200 applies optionally decrypted $E_U$ and $N_U$, if appropriate, to decrypt CSPG and recover PG, i.e. Decrypt (CSPG, $E_U$)=PG.

If, at step 915, the decryption is determined to be successful, the user device 30 has explicitly verified the sponsor's knowledge of $D_{U1}$ and $D_{U2}$, thereby fully authenticating the sponsor to the user and completing the primary login at step 920. If not, at step 917 the processor 300 of the user PC 200 may immediately terminate the session and request suspension of the user's ID. It will be recognized that, if desired, the processor 300 could also make a further determination, such as whether or not the recovered permission grant PG is in a particular predefined form or has a particular predefined attribute, to further authenticate the sponsor, although this might require a very small footprint.

The successful completion of final sponsor authentication and completion of primary login implicitly verifies the sponsor's knowledge of the applicable rolling key, which at this stage of the implementation being described is $E_R$, since this key was required to decrypt the augmenting factor $F_{ak}$, in this implementation the private key $D_{ak}$, which was in turn required to correctly construct the user's split key portion, in this implementation the private key portion $D_{U1}$, which was in turn required to authenticate the sponsor to the user. However, in the future the successful completion of final sponsor authentication and completion of login will implicitly verify the sponsor's knowledge of the then applicable rolling key, i.e. $E_{R1} \ldots E_{RN}$.

Upon successful completion of sponsor authentication and primary login, both the user and the sponsor can be considered authenticated to each other, and the sponsor station 50 and the user device 30 could at this point interact to create a symmetric session crypto-key $K_S$ for use in encrypting and MACing communications between the two. Creation and general use of such a session key is well known in the art and according will not be further described here.

-Steps 900-925 Provide Further Protection Against Impostor Website Attacks-

The use of the CSPG to authenticate the sponsor to the real user provide further back end protection against impostor website attacks. More particularly, because an imposter will lack access to $D_{U2}$ and be incapable of computing $D_{U1}$, it will also be incapable of authenticating itself to the user as the sponsor.

However, the CSPG will not serve its intended purpose of authenticating the real sponsor to the user, if the user is subjected to a successful MITM attack. Rather, in such cases the CSPG will be obtained by the attacker and could be used to authenticate the attacker as the sponsor to the user.

-Augmenting the User Authentication-

The recovered PG can be used to further authenticate the user to the sponsor if desired. To do so, at step 925 the processor 500 of sponsor server 400 directs transmission of a request for PG (RPG). If a session key $K_S$ has been distributed based on completion of the primary login, the RPG is preferably encrypted with the session key $K_S$, i.e. ciphertext RPG=Encrypt (RPG, $K_S$). Note that in order for the network device with which the sponsor station is communicating to have knowledge of PG, it must have access to $E_U$. In accordance with this directive, the modem 560 and I/O port 565 function to transmit the optionally encrypted RPG to the user device 30 via network 10.

The I/O port 365 receives the transmitted, optionally encrypted, RPG and modem 360 directs the received, optionally encrypted RPG to processor 300 of the user PC 200. If applicable, the processor 300 of user PC 200 applies the symmetric session crypto-key $K_S$, to decrypt RPG, i.e. RPG=Decrypt (CRPG, $K_S$).

At step 930, the processor 300 of user device 30 directs and, in accordance with this directive, the modem 360 and I/O port 365 function to transmit PG to the sponsor station 50 via network 10. Here again, if a session key $K_S$ has been previously distributed, the PG is preferably encrypted with the session key $K_S$, i.e. ciphertext PG=Encrypt (PG, $K_S$).

The I/O port 565 receives the transmitted, optionally encrypted, PG and modem 560 directs the received, optionally encrypted, PG to processor 500 of the sponsor server 400. If applicable, the processor 500 of the sponsor server 400 applies the symmetric session crypto-key $K_S$, to decrypt PG, i.e. PG=Decrypt (CPG, $K_S$).

At step 935, the processor 500 of sponsor server 400 determines if the received, and optionally decrypted, PG matches the PG originally transmitted by the sponsor station in the CSPG.

If the optionally decrypted PG matches the PG originally transmitted in the CSPG, the sponsor station 50 has explicitly verified the user's knowledge of PG, and implicitly of $E_U$, thereby augmenting the authentication of the user to the sponsor and completing the augmented login at step 945. If not, at step 940 the processor 500 of the sponsor server 400 may immediately terminate the session and suspend the user's ID and password.

The successful completion of the augmented user authentication implicitly verifies the user's knowledge of $E_U$, since this key was required to decrypt the encrypted, signed permission request CSPG.

Upon successful completion of the augmented login, the sponsor station 50 and the user device 30 can freely utilize the symmetric session crypto-key $K_S$ to encrypt and MAC further communications between the two.

In summary, the above described augmented single factor split private key asymmetric cryptography provides true, zero footprint protection against impostor websites. Furthermore, while no zero footprint solution can provide true protection against MITM attacks, the above described augmented single factor split private key asymmetric cryptography provides enhanced protection against MITM attacks, as compared to previously proposed zero footprint solutions. Additionally, by optionally adding the above described rolling key security and augmented user authentication, the system is even more difficult for an attacker to defeat via an MITM attack.

Second Embodiment of Zero Footprint Phishing Protection Using an Augmented Single-Factor Split Key Asymmetric Cryptography As will be described in detail below, another technique different from that described in the first embodiment of the present invention, has also been developed using split key asymmetric cryptography to provide zero footprint phishing protection using an augmented single-factor split key asymmetric cryptography. Like the first embodiment, the second embodiment relies on aspects of the above described single-factor split key asymmetric cryptography, i.e. single armored mode cryptography. However, in this embodiment different enhancements are made to the single armored mode cryptography. The result is another hybrid cryptography that we also refer to as augmented single-factor split key asymmetric cryptography.

As will be further describe below, in the second embodiment of augmented single factor split private key cryptography, the user's split key portion of the user's asymmetric crypto-key, e.g. $D_{U1}$ of a split private key $D_U$ of the user's asymmetric crypto-key $D_U, E_U$ is computed using only a single factor, such as a factor corresponding to the user's password, which has been referred to above as $F_p$. For purposes of this description, we will assume that $F_p$ is the user's password itself, as in the described first embodiment of the invention.

We also utilize an augmenting factor $F_{ak}$ stored in a cookie on the user's network device, in lieu of a second factor such as the above described $F_{k1}$ or $F_{k2}$, to augment the single factor and thereby enhance the protection against phishing. However, whereas in the first embodiment the augmenting factor $F_{ak}$ was used to compute the user's split key portion of the user's asymmetric crypto-key, e.g. $D_{U1}$, in this embodiment the augmenting factor $F_{ak}$ is used to independently authenticate the user.

Thus, in this embodiment, the process is as described above with reference to the first embodiment of the invention, with the certain changes that will be evident from the following description.

Key Generation Protocol

Figure 11:
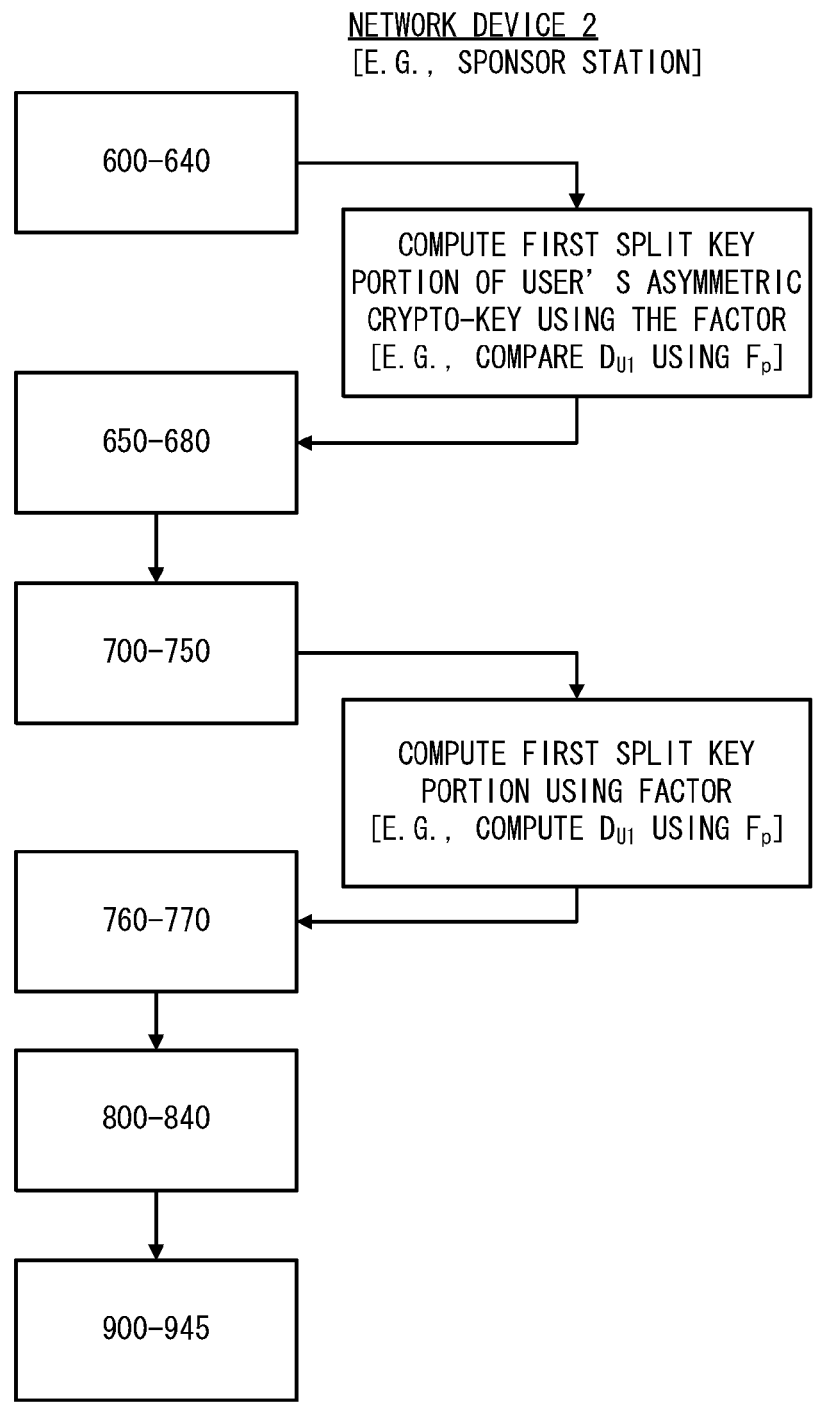
FIG. 11 depicts a flow chart showing operations performed during the key generation protocol and the user login protocol, in accordance with a second embodiment of the present invention.

Referring now to FIG. 11, in accordance with the second embodiment of the invention steps 600-640 of the key generation protocol are performed as described above with reference to the first embodiment of the invention. As previously described, at step 640 the processor 500 of the sponsor's server 400 generates another, i.e. a third, asymmetric crypto-key pair, including private key $D_U$, public key $E_U$, and modulus $N_U$, which will serve as the user's asymmetric crypto-key, as has been previously described with reference to the first embodiment of the invention.

Next, the processor 500 of the sponsor's server 400 splits $D_U$ into at least a first private key portion $D_{U1}$, which corresponds to the first private key portion sometimes referred to above as D1, and a second private key portion $D_{U2}$, which corresponds to the second private key portion sometimes referred to above as D2, by first determining $D_{U1}$, and then determining $D_{U2}$ utilizing conventional techniques based on the well known relationship between $D_{U1}$ and $D_{U2}$, i.e. $D_{U1} * D_{U2} = D \mod \Phi(N)$.

However, in the second embodiment the processing to determine $D_{U1}$ is based upon on only the single factor $F_p$. Thus, unlike the first embodiment of the invention, in the second embodiment $D_{U1}$ is not determined based on the augmenting factor $F_{ak}$. In this implementation the single factor $F_p$ is also assumed to be the user's password itself and the augmenting factor $F_{ak}$ is the private key $D_{ak}$, of an augmenting asymmetric crypto-key pair, but it is perhaps worthwhile to reiterate that the single factor and/or the augmenting factor could be other type factors. For example, the single factor could alternatively be a hash of the password, such as Sha-1 (password), some other function of the password, or a value that does not correspond to the user's password, so long as using such a factor would not require a footprint on the user's device 30. The augmenting factor could be a symmetric key or other random number.

Accordingly, in the second embodiment step 645' is substituted for step 645 of the first embodiment of the invention. More specifically, the user's password is, at this point in the process, temporarily, i.e. not persistently, stored at the sponsor station 50, e.g. on the RAM 523, and therefore accessible to processor 500. At step 645' the processor 500 of the sponsor's server 400 also preferably calculates $D_{U1}$ utilizing the PKCS-5 algorithm, which is a well known one way function that can be stored on the hard disk 525 or elsewhere at sponsor station 50. The equation for $D_{U1}$ is as follows:

$$D_{U1}=PKCS\text{-}5(\{F_p\}, \text{salt, iteration count}) \quad (5)$$

Thus, in this implementation of the second embodiment of the invention, $D_{U1}$ is computed in by taking the single factor $F_p$, where $F_p$=password, as an input to the PKCS-5 algorithm, along with the salt and the iteration count, i.e. $D_{U1}$=PKCS-5 ({password}, salt, iteration count). After the determination of $D_{U1}$, the sponsor's server 400 has knowledge of $D_{U1}$, $D_U$ and $N_U$.

Alternatively, the single factor $F_p$ could be expanded as part of the computation of $D_{U1}$ at step 645'. For example, the processor 500 of the sponsor's server 400 could calculate Sha-1 (password), before calculating $D_{U1}$ utilizing the PKCS-5 algorithm, at step 645'. The equation for $D_{U1}$ is as follows:

$$D_{U1}=PKCS\text{-}5(\{\text{Sha-}1(F_p)\}, \text{salt, iteration count}) \quad (6)$$

Thus, in this alternative, $D_{U1}$ is computed by expanding the single factor $F_p$, where $F_p$=password, with a hash function and then using the result of this expansion as an input to the PKCS-5 algorithm, along with the salt and the iteration count, i.e. $D_{U1}$=PKCS-5 ({Sha-1 (password)}, salt, iteration count).

Notwithstanding how $D_{U1}$ is calculated, in accordance with the second embodiment of the invention proceeds with steps 650-680.

Login Protocol

As shown in FIG. 11, steps 700-750 of the login protocol are performed in the second embodiment of the invention as described above with reference to the first embodiment of the invention. However, because the augmenting key is not used to generate the user's split key portion of the user split asymmetric crypto-key in the second embodiment of the invention, step 755' is substituted for step 755 of the first embodiment of the invention.

Accordingly, at step 755' the processor 500 of sponsor's server 400 computes $D_{U1}$ by applying only $F_p$, i.e. only the user password itself in this implementation, as an input to the PKCS-5 algorithm, along with the salt and the iteration count. The equation for $D_{U1}$ is as follows:

$$D_{U1}=PKCS\text{-}5(\{F_p\}, \text{salt, iteration count}) \quad (7)$$

Thus, in this implementation of the second embodiment of the invention, $D_{U1}$ is computed in by taking the single factor $F_p$, where $F_p$=password, as an input to the PKCS-5 algorithm, along with the salt and the iteration count, i.e. $D_{U1}$=PKCS-5 ({password}, salt, iteration count). After computing $D_{U1}$, the sponsor's server 400 has knowledge of $D_{U1}$, $D_{U2}$, and $N_U$, can therefore sign and/or encrypt information that can be recovered with $E_U$.

In accordance with the second embodiment of the invention proceeds with steps 760-770 to complete initial login, with steps 800-840 to reset the rolling key, and with steps 900-945 to complete final login.

Implementations of the Invention Using an Augmenting Factor Which is Not a Private or Public Key of an Asymmetric Crypto-Key Although the above preferred embodiments of the invention have been described with a key, e.g. $D_{ak}$, of an asymmetric crypto-key pair, e.g. $D_{ak}, E_{ak}$, serving as the augmenting factor $F_{ak}$, as noted above the augmenting factor could take a different form. For example, the augmenting factor $F_{ak}$ could be a random character sting, such as a symmetric crypto-key or some other type of random number string (RNS). If so, it will be understood that the key generation protocol described above would change accordingly.

For example, rather than generating $D_{ak}, E_{ak}$ in step 605, the sponsor station might instead generate a symmetric crypto-key $K_{ak}$ to serve as the augmenting factor $F_{ak}$. In such a case, $K_{ak}$ would replace both $D_{ak}$ and $E_{ak}$. In this regard, $K_{ak}$ would be encrypted with the rolling key, e.g. $D_R$, and included in a CM planted at the user device 30 in place of $D_{ak}$. $K_{ak}$ would also be stored, preferably securely, at the sponsor station 50 in place of $E_{ak}$. If desired, $K_{ak}$ could be stored at the sponsor station in lieu of $E_{ak}$ within the database shown in FIG. 10A or the database shown in FIG. 10B, as applicable. Alternatively, $K_{ak}$ could be stored at the sponsor station in a general look-up table. In either case, to determine whether or not the $K_{ak}$ included in the CM transmitted from the user device 30 to the sponsor station 50 during the login protocol is valid, the sponsor station could, for example, compare the $K_{ak}$ in the received CM with the $K_{ak}$ stored at the sponsor station, or encrypt a test message ($TM_{ak}$) with either the received or stored $K_{ak}$ and attempt to decrypt the encrypted test message with the other the received or stored $K_{ak}$.

As an alternative example, rather than generating $D_{ak}, E_{ak}$ in step 605, the sponsor station might instead generate a random number string ($RNS_{ak}$) having a check sum ($CS_{ak}$), to serve as the augmenting factor $F_{ak}$. In such a case, $RNS_{ak}$ would be stored in a cookie message at the user device 30 in place of $D_{ak}$. $RNS_{ak}$ could, if desired, also be stored at the sponsor station 50 in place of $E_{ak}$. However, it may be beneficial to store only the $CS_{ak}$ at the sponsor station. The $CS_{ak}$ could be stored at the sponsor station in lieu of $E_{ak}$ within the database shown in FIG. 10A or the database shown in FIG. 10B, as applicable. Alternatively, $CS_{ak}$ could be stored at the sponsor station in a general look-up table. In this regard, the table might, for example, be set-up such that, if the first 3 numbers of the received $RNS_{ak}$ include a first combination of numbers, the $CS_{ak}$ is a first checksum, if the first 3 numbers of the received $RNS_{ak}$ include a second combination of numbers, the $CS_{ak}$ is a second checksum, and so on and so forth. In either case, to determine whether or not the $RNS_{ak}$ included in the CM transmitted from the user device 30 to the sponsor station 50 during the login protocol is valid, the sponsor station could, for example, compute a checksum ($CCS_{ak}$) from the $RNS_{ak}$ included in the received CM, and compare $CCS_{ak}$ with the $CS_{ak}$ stored at the sponsor station.

In summary, the above described augmented single factor split private key asymmetric cryptography provides true, zero footprint protection against phishers using impostor websites.

While no zero footprint solution can provide true protection against phishers launching MITM attacks, the above described augmented single factor split private key asymmetric cryptography provides much enhanced protection against MITM attacks, as compared to previously proposed zero footprint solutions. Additionally, by optionally adding the above described rolling key security and augmented user authentication, the system is even more difficult for an attacker to defeat via an MITM attack.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. in providing security for network communications, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

What is claimed is:

1. An article of manufacture for establishing credentials useable to authenticate a user of a communications network using split key asymmetric cryptography, comprising:
   processor readable storage media; and
   logic stored on the storage media, wherein the stored logic is configured to be readable by one or more processors associated with an authenticating entity, and thereby cause the one or more processors to operate so as to:
   receive a first value from the user via the network;
   generate a first key portion based on the received first value and a second value unknown to the user;
   split one of a private key and a public key of a user asymmetric crypto-key into the first key portion and a second key portion;
   store the second key portion of the one key of the user asymmetric crypto-key so as to be accessible only to the authenticating entity;
   generate a cookie including the second value;
   transmit the generated cookie to the user;
   destroy the received first value, the second value, the one key of the user asymmetric crypto-key and the first key portion of the one key of the user asymmetric crypto-key wherein after transmission of the generated cookie and destruction, neither the first value, nor the second value, nor the first key portion of the one key of the user asymmetric crypto-key, nor the one key of the user asymmetric crypto-key is accessible to the authenticating entity, and neither the first key portion of the one key of the user asymmetric crypto-key nor the one key of the user asymmetric crypto-key is accessible to the user;
   subsequently receive the first value, representing a first user credential, and the second value included in the transmitted cookie, representing a second user credential, from the user; and
   authenticate the user based on the subsequently received first and second values.

2. The article of manufacture according to claim 1, wherein:
   the first value corresponds to a user password.

3. The article of manufacture according to claim 2, wherein:
   the first value is the user password itself.

4. The article of manufacture according to claim 1, wherein:
   the second value corresponds to a crypto-key.

5. The article of manufacture according to claim 4, wherein:
   the second value is one of a private key and a public key of another asymmetric crypto-key; and
   the stored logic is configured to cause the one or more processors to operate so as to store the other key of the other asymmetric crypto-key so as to be accessible only to the authenticating entity.

6. The article of manufacture according to claim 1, wherein:
   the stored logic is configured to cause the one or more processors to operate so as to encrypt the second value; and
   the second value included in the generated cookie is the encrypted second value.

7. The article of manufacture according to claim 6, wherein:
   the second value is encrypted with one of a private key and a public key of another asymmetric crypto-key;
   the stored logic is configured to cause the one or more processors to operate so as to destroy the one key of the other asymmetric crypto-key, and store the other key of the other asymmetric crypto-key so as to be accessible only to the authenticating entity; and
   after transmission of the generated cookie and destruction, the one key of the other asymmetric crypto-key is not accessible to the authenticating entity.

8. The article of manufacture according to claim 6, wherein:
   the second value is encrypted with a symmetric crypto-key; and
   the stored logic is configured to cause the one or more processors to operate so as to store the symmetric crypto-key so as to be accessible only to the authenticating entity.

9. A system for establishing credentials useable to authenticate a user of a communications network using split key asymmetric cryptography, comprising:
   an interface for receiving a first value from a network device associated with the user via the network;
   a processor configured to (i) generate a first key portion based on the received first value and a second value unknown to the user, (ii) split one of a private key and a public key of a user asymmetric crypto-key into the first key portion and a second key portion, (iii) generate a cookie including the second value, (iv) directly transmit the generated cookie to the user network device, and (v) destroy the received first value, the second value, the one key of the user asymmetric crypto-key and the first key portion of the one key of the user asymmetric crypto-key;
   a data store configured to store the second key portion of the one key of the user asymmetric crypto-key so as to be accessible to the processor but not to the user network device;
   wherein after transmission of the cookie and destruction, neither the first value, nor the second value, nor the first key portion of the one key of the user asymmetric crypto-key, nor the one key of the user asymmetric crypto-key is accessible to the processor, and neither the first key portion of the one key of the user asymmetric crypto-key nor the one key of the user asymmetric crypto-key is accessible to the user network device;

wherein the interface is also for subsequently receiving the first value, representing a first user credential, and the second value included in the transmitted cookie, representing a second user credential, from the user;

wherein the processor is further configured to authenticate the user based on the subsequently received first and second values.

10. The system according to claim 9, wherein:
the first value corresponds to a user password.

11. The system according to claim 9, wherein:
the second value is one of a private key and a public key of another asymmetric crypto-key; and
the data store is further configured to store the other key of the other asymmetric crypto-key so as to be accessible to the processor but not to the user network device.

12. The system according to claim 9, wherein:
the processor is further configured to (i) encrypt the second value with one of a private key and a public key of another asymmetric crypto-key, and (ii) destroy the one key of the other asymmetric crypto-key;
the data store is further configured to store the other key of the other asymmetric crypto-key so as to be accessible to the processor but not to the user network device;
the second value included in the generated cookie is the encrypted second value; and
after transmission of the cookie and destruction, the one key of the other asymmetric crypto-key is not accessible to the processor.

13. The system according to claim 9, wherein:
the processor is further configured to encrypt the second value with a symmetric crypto-key;
the data store is further configured to store the symmetric crypto-key; and
the second value included in the generated cookie is the encrypted second value.

14. A networked system for establishing credentials useable to authenticate a user of a communications network using split key asymmetric cryptography, comprising:
a network station, associated with the user, configured to transmit a first value via the network;
a network station, associated with an authenticating entity, configured to (i) generate a first key portion based on the transmitted first value and a second value unknown to the user, (ii) split one of a private key and a public key of a user asymmetric crypto-key into the first key portion and a second key portion, (iii) store the second key portion of the one key of the user asymmetric crypto-key so as to be accessible only to the authenticating entity network station, (iv) generate a cookie including the second value, (v) transmit the generated cookie via the network, and (vi) destroy the transmitted first value, the second value, the one key of the user asymmetric crypto-key and the first key portion of the one key of the user asymmetric crypto-key;

wherein the user network station is further configured to store the transmitted cookie;

wherein after transmission of the cookie and destruction, neither the first value, nor the second value, nor the first key portion of the one key of the user asymmetric crypto-key, nor the one key of the user asymmetric crypto-key is accessible to the authenticating entity network station, and neither the first key portion of the one key of the user asymmetric crypto-key nor the one key of the user asymmetric crypto-key is accessible to the user network station;

wherein the user network station is further configured to subsequently transmit the first value, representing a first user credential, and the second value included in the transmitted cookie, representing a second user credential;

wherein the authenticating entity network station is further configured to authenticate the user based on the subsequently transmitted first and second values.

15. The networked system according to claim 14, wherein:
the first value corresponds to a user password.

16. The networked system according to claim 14, wherein:
the authenticating entity network station is further configured to encrypt the second value; and
the second value included in the generated cookie is the encrypted second value.

17. The networked system according to claim 16, wherein:
the second value is encrypted with one of a private key and a public key of another asymmetric crypto-key;
the authenticating entity network station is further configured to (i) destroy the one key of the other asymmetric crypto-key, and store the other key of the other asymmetric crypto-key so as to be accessible only to the authenticating entity network station;
after transmission of the generated cookie and destruction, the one key of the other asymmetric crypto-key is not accessible to the authenticating entity network station.

18. The networked system according to claim 16, wherein:
the second value is encrypted with a symmetric crypto-key; and
the authenticating entity network station is further configured to store the symmetric crypto-key so as to be accessible to the authenticating entity network station.

\* \* \* \* \*